United States Patent
Tokuchi

(10) Patent No.: US 12,028,706 B2
(45) Date of Patent: Jul. 2, 2024

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM BUSINESS INNOVATION CORP., Tokyo (JP)

(*) Notice: Subject to any disclaimer, the term of this patent is extended or adjusted under 35 U.S.C. 154(b) by 542 days.

(21) Appl. No.: 17/070,333

(22) Filed: Oct. 14, 2020

(65) Prior Publication Data

US 2021/0337382 A1    Oct. 28, 2021

(30) Foreign Application Priority Data

Apr. 22, 2020   (JP) .................. 2020-076144

(51) Int. Cl.
*H04W 12/06* (2021.01)
*H04L 9/40* (2022.01)

(52) U.S. Cl.
CPC ......... *H04W 12/06* (2013.01); *H04L 63/0861* (2013.01)

(58) Field of Classification Search
CPC ... H04W 12/06; H04W 12/069; H04W 12/40; H04W 12/08; H04L 63/0861; G06F 21/32; G06F 21/35
See application file for complete search history.

(56) References Cited

U.S. PATENT DOCUMENTS

2004/0073803 A1*  4/2004  Keramane ............... G06F 21/32
                                                      713/186
2010/0169651 A1*  7/2010  Scheidt ................. H04L 9/3231
                                                      713/176

FOREIGN PATENT DOCUMENTS

| JP | 2006-260603 A | 9/2006 |
| JP | 2007-328616 A | 12/2007 |
| JP | 2010-108112 A | 5/2010 |
| JP | 2016-529600 A | 9/2016 |
| JP | 2020-24603 A | 2/2020 |

OTHER PUBLICATIONS

Oct. 3, 2023 Office Action issued in Japanese Patent Application No. 2020-076144.
Jan. 9, 2024 Office Action issued in Japanese Patent Application No. 2020-076144.

* cited by examiner

*Primary Examiner* — Kabir A Timory
(74) *Attorney, Agent, or Firm* — Oliff PLC

(57) ABSTRACT

An information processing apparatus includes a processor configured to not authorize use of a communication service when stored first biometric information on a contractee for the communication service fails to match second biometric information acquired from a user who is to use the communication service after signing a contract for the communication service.

15 Claims, 21 Drawing Sheets

FIG. 4

| PATTERN | LOCATION 1 | LOCATION 2 |
|---|---|---|
| PATTERN 1 | RECORDING MEDIUM REMOVABLE FROM COMMUNICATION TERMINAL (E.G., SIM CARD OR EXTERNAL MEMORY) | |
| PATTERN 2 | COMMUNICATION ENTITY SYSTEM | |
| PATTERN 3 | RECORDING MEDIUM REMOVABLE FROM COMMUNICATION TERMINAL (E.G., SIM CARD OR EXTERNAL MEMORY) | COMMUNICATION ENTITY SYSTEM |

FIG. 20

| PATTERN | LOCATION 1 | LOCATION 2 |
|---|---|---|
| PATTERN 1 | RECORDING MEDIUM MOUNTED ON COMMUNICATION TERMINAL (E.G., INTERNAL MEMORY) | |
| PATTERN 2 | COMMUNICATION ENTITY SYSTEM | |
| PATTERN 3 | RECORDING MEDIUM MOUNTED ON COMMUNICATION TERMINAL (E.G., INTERNAL MEMORY) | COMMUNICATION ENTITY SYSTEM |

# INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-076144 filed Apr. 22, 2020.

BACKGROUND

(i) Technical Field

The present disclosure relates to an information processing apparatus and a non-transitory computer readable medium.

(ii) Related Art

Some services provided on a network (hereinafter referred to as "network services") are based on the premise that a user of a communication terminal is identical to a contractee of a communication service using a telephone number. If the user's identity is to be verified to use the network service, a short message may be sent to a registered telephone number to authenticate the user. Reference is made to Japanese Unexamined Patent Application Publication No. 2020-24603.

Information on a contractee for service using a telephone number is stored on an integrated circuit (IC) card called a subscriber identity module (SIM) card. If a communication terminal loaded with another person's SIM card is in a ready to use state, service using the loaded SIM card will be available. As a result, a SIM card taken out of a communication terminal found by someone after being lost or stolen may be illegally used on a different communication terminal. If the communication terminal found by someone after being lost or stolen becomes usable using any technique, unauthorized use of the SIM card in the communication terminal is possible.

SUMMARY

Aspects of non-limiting embodiments of the present disclosure relate to controlling unauthorized use of communication service in contrast to the case in which as long as a communication terminal is in a usable state, use of a communication service based on a contract is authorized.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to not authorize use of a communication service in response to stored first biometric information on a contractee for the communication service failing to match second biometric information acquired from a user who is to use the communication service after signing a contract for the communication service.

BRIEF DESCRIPTION OF THE DRAWINGS

Exemplary embodiments of the present disclosure will be described in detail based on the following figures, wherein:

FIG. 4 illustrates a location where information related to biometric information on a contractee is stored;

FIGS. 13A through 13C illustrate examples of a removal mechanism, wherein FIG. 13A illustrates a tray on which a SIM card is mountable, FIG. 13B illustrates the removal mechanism in a locked state, and FIG. 13C illustrates the removal mechanism in an unlocked state;

FIG. 20 illustrates a location where information related to biometric information on a contractee is stored.

DETAILED DESCRIPTION

Exemplary embodiments of the present disclosure are described below.

First Exemplary Embodiment

Configuration of Communication Terminal

Figure 1:
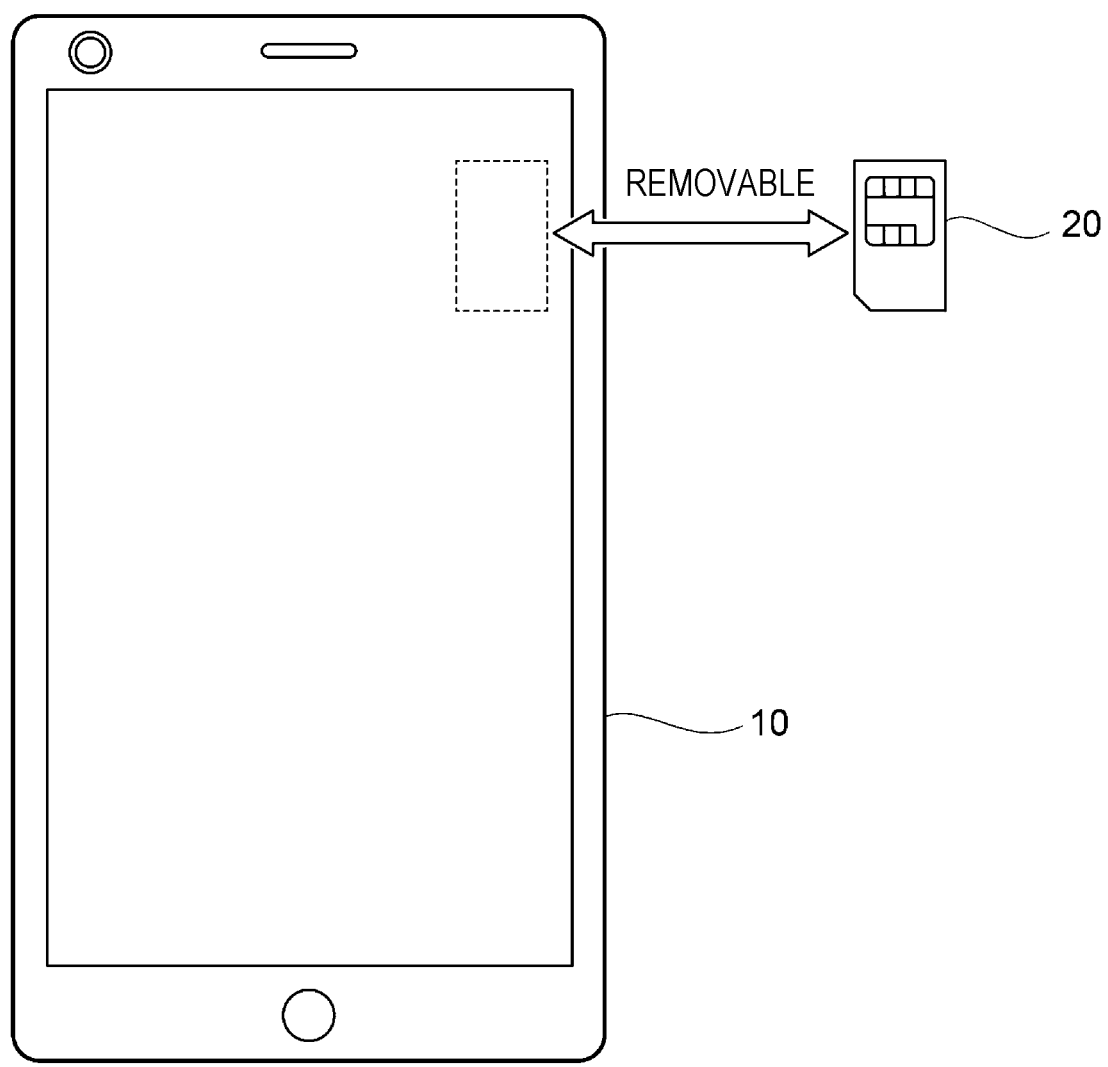
FIG. 1 illustrates a communication terminal of a first exemplary embodiment.

FIG. 1 illustrates a communication terminal 10 used in a first exemplary embodiment. The communication terminal 10 used in the first exemplary embodiment has a dedicated slot that removably receives an IC card called a subscriber identity module (SIM) card 20.

A broken-line box region in FIG. 1 indicates an example of a location where the SIM card 20 is mounted on the communication terminal 10. A double-arrow headed mark indicates that the SIM card 20 is removably mounted on the communication terminal 10. Referring to FIG. 1, the SIM card 20 is a device that is physically independent of the communication terminal 10.

The communication terminal 10 includes but is not limited to a smart phone in FIG. 1. The communication terminal 10 may also be a tablet computer (hereinafter referred to as a tablet terminal), notebook computer, industrial robot, network device (such as a router), security camera, construction machine, medical equipment, or information appliance. The information appliances may include televisions, video recorders, air-conditioners, lighting equipment, and car navigation.

The communication terminal 10 of the first exemplary embodiment is not limited to the device illustrated and may be any device as long as it is enabled to communicate with an external device using SIM information. The same is true of a communication terminal 10A of a second exemplary embodiment (see FIG. 19).

The communication terminal 10 of the first exemplary embodiment has a dedicated slot that removably receives the SIM card 20. The communication terminal 10 is an example of an information processing apparatus that uses the SIM card 20.

The SIM card 20 stores information used to connect to a cellular phone network (hereinafter referred to as SIM information). The SIM information includes a telephone number assigned to a contractee and an identity number called international mobile subscriber identity (IMSI).

The SIM card 20 of the first exemplary embodiment may a card supporting voice communication or a card not supporting voice communication but dedicated to data communication. The cellular phone network is an example of a communication network using the SIM information. In other words, the cellular phone network is an example of communication network that is based on a contract for use of communication service.

The SIM card 20 of the first exemplary embodiment is provided by a mobile network operator or a mobile virtual network operator. The mobile virtual network operator refers to an operator that borrows communication infrastructure from the mobile network operator and provides service. The mobile network operator and the mobile virtual network operator are referred to as a communication entity.

The SIM card 20 has a non-volatile memory that is electronically re-writable. An empty region of the non-volatile memory arranged in the SIM card 20 may store file data and the like on a user. The SIM card 20 of the first exemplary embodiment may not necessarily be a storage medium dedicated to the SIM information. In other words, even a general-purpose storage medium removably mountable on the communication terminal 10 may be used as the SIM card 20 after the SIM information is written on it.

Figure 2:
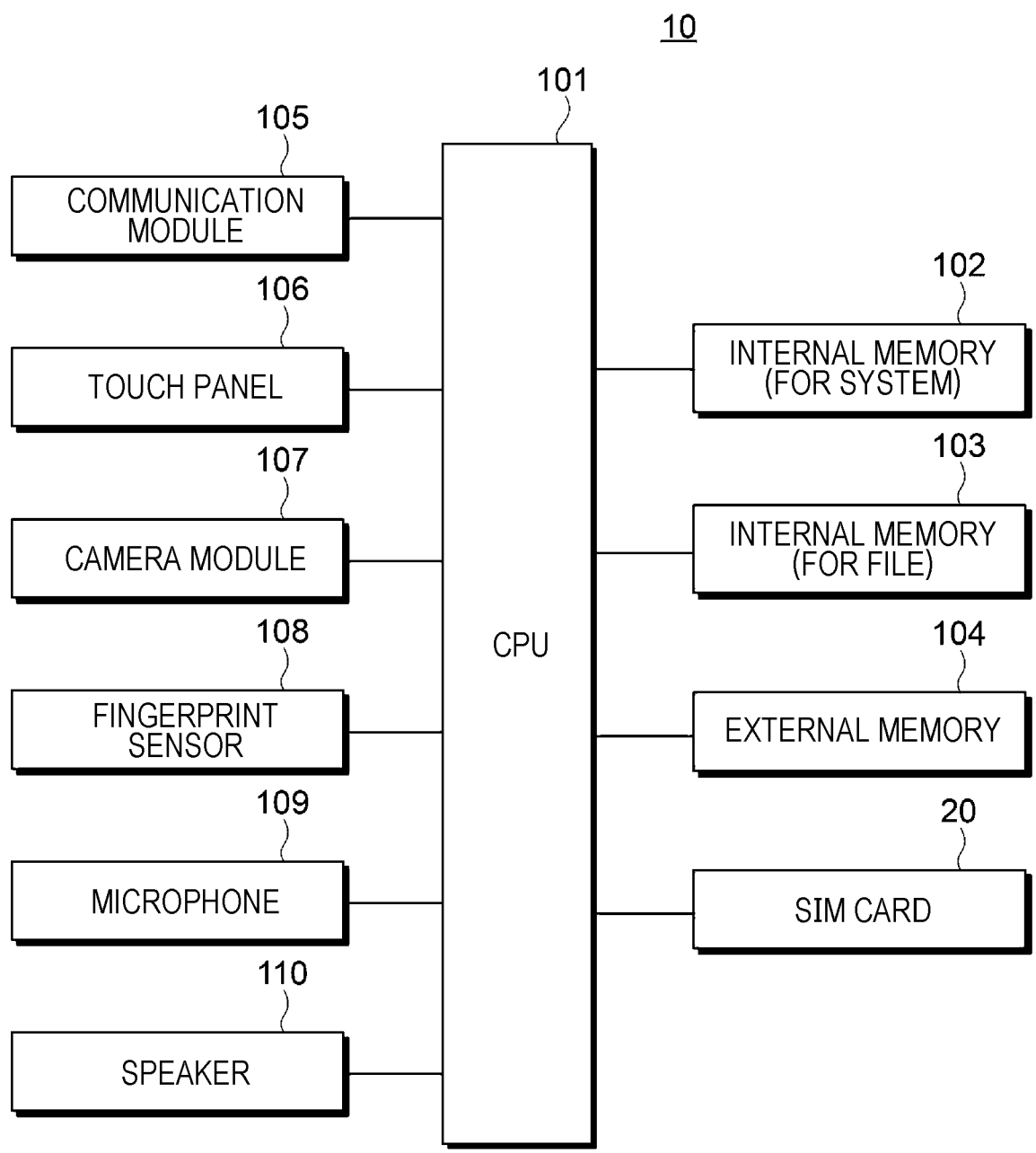
FIG. 2 illustrates an example of a hardware configuration of the communication terminal of the first exemplary embodiment.

FIG. 2 illustrates an example of a hardware configuration of the communication terminal 10 used in the first exemplary embodiment.

The communication terminal 10 in FIG. 2 includes a central processing unit (CPU) 101, internal memory 102, internal memory 103, external memory 104, SIM card 20, communication module 105, touch panel 106, camera module 107, fingerprint sensor 108, microphone 109, speaker 110, and the like. The CPU 101 controls elements of the communication terminal 10 by executing a computer program. The internal memory 102 stores system data, such as firmware. The internal memory 103 stores file data and the like. The external memory 104 is removably mounted on the body of the communication terminal 10. The communication module 105 implements a variety of communication methods. The touch panel 106 is used to display information and enter operations. The camera module 107 captures an image. The fingerprint sensor 108 reads a pattern of fingerprint. The microphone 109 is used for voice communication and recording. The speaker 110 is used to reproduce voice.

Each of the internal memories 102 and 103 and the external memory 104 is a non-volatile semiconductor memory. The internal memories 102 and 103 are mounted on a board (not illustrated). The internal memories 102 and 103 are also referred to as an embedded memory. The external memory 104 serves as an extended memory for the internal memories 102 and 103. The external memory 104 having the SIM information written thereon serves substantially as the SIM card 20.

The communication module 105 has a function supporting communication complying with mobile communication standards 4G and 5G, a function implementing Wi-Fi (registered trademark) communication, a function supporting universal serial bus (USB) communication, a function supporting Bluetooth (registered trademark), and a function supporting radio frequency identification (RFID) communication. The communication terminal 10 of the first exemplary embodiment communicates with another terminal via the Internet through Wi-Fi interface.

The touch panel 106 includes an organic electroluminescent (EL) display having an array of light emitting elements on a substrate and a film sensor arranged on the organic EL display.

The film sensor has transparency that does not impede the viewing of an image displayed on the organic EL display. The file sensor detects a location on an electrostatic capacitance screen operated by a user. The display device may a liquid-crystal display in place of the organic EL display. The communication terminal 10 may include display devices respectively arranged on multiple screens.

The camera module 107 is a complementary metal oxide semiconductor (CMOS) image sensor. The camera module 107 is not limited to any particular application thereof and is typically used to photograph the face of a user of the communication terminal 10. Image data obtained by photographing the face of the user is an example of biometric information. The camera module 107 may be a laser scanner that acquires three-dimensional data on the face of the user.

The fingerprint sensor 108 acquires a fingerprint of a finger touching the sensor screen in an electrostatic capacitance method. The pattern data corresponding to the fingerprint is an example of the biometric information.

All the devices illustrated in FIG. 2 are not necessarily mounted in a unitary body on the communication terminal 10. Specifically, some of the devices in FIG. 2 like the external memory 104 or the SIM card 20 may be removably mounted on the communication terminal 10.

Configuration of the Network System

Figure 3:
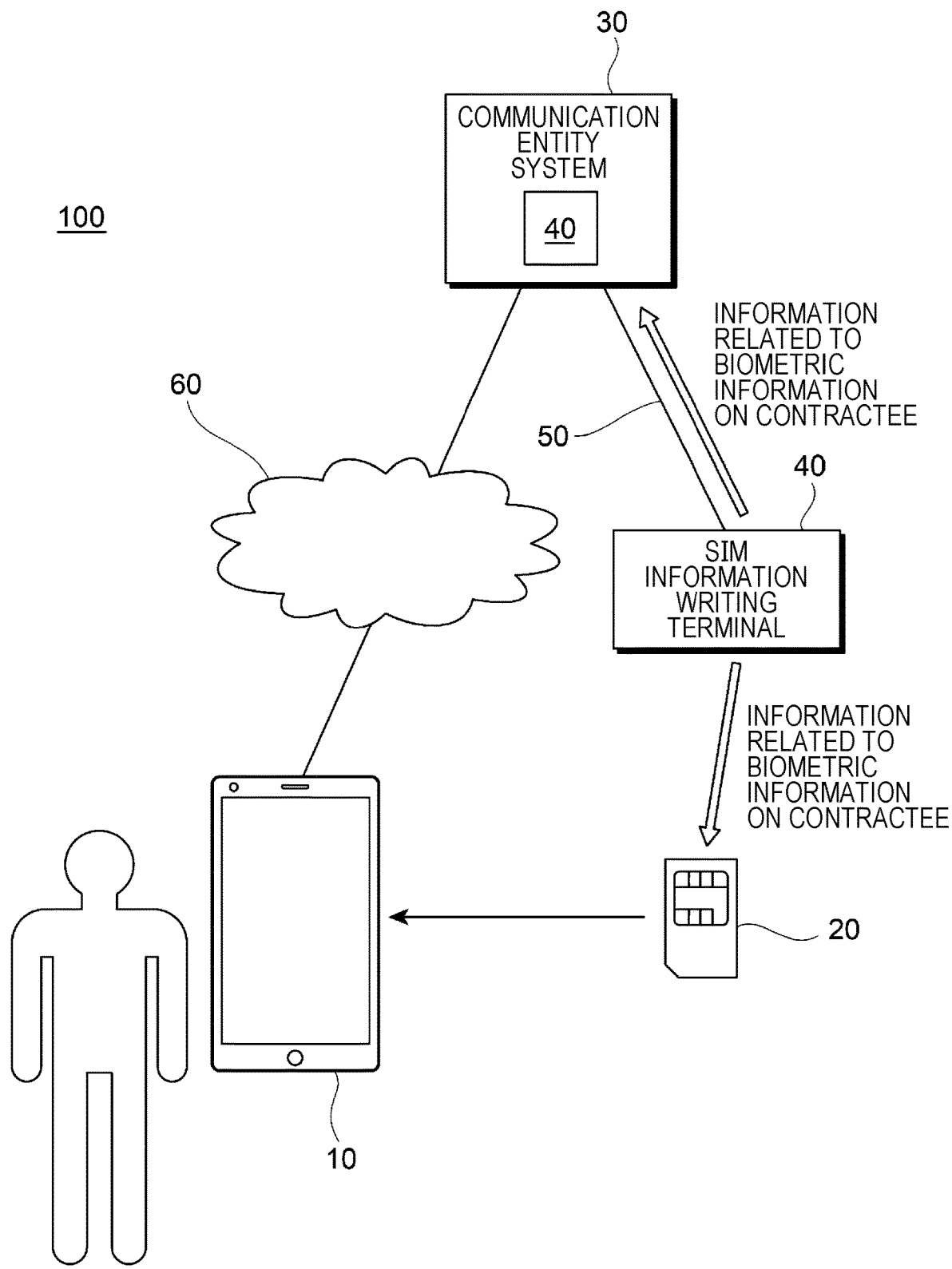
FIG. 3 illustrates an example of a network system that is constructed to control unauthorized use of the communication service.

FIG. 3 illustrates a network system 100 that is constructed to control unauthorized use of a communication service.

The network system 100 includes a communication entity system 30, SIM information writing terminal 40, network 50, and Internet 60. The communication entity system 30 is used by the communication entity to manage information on contractees. The SIM information writing terminal 40 writes the SIM information on the SIM card 20. The network 50 is used for the communication between the communication entity system 30 and the SIM information writing terminal 40. The Internet 60 is used for the communication between the communication terminal 10 and the communication entity system 30.

The communication entity system 30 of the first exemplary embodiment is an example of a server of the communication entity providing the communication service.

The SIM information writing terminal 40 is installed in an office of the communication entity or an office of a partner company where a service counter of the communication entity is arranged.

If a contract is signed between the communication entity and a contractee desiring to use the communication service in an actual office, the SIM information is transmitted to the SIM information writing terminal 40 from the communication entity system 30 via the network 50. The network 50 secures the confidentiality.

According to the first exemplary embodiment, during the signing of the contract of the communication service, information related to the biometric information on the contractee is acquired and is written together with the SIM information onto the SIM card 20. Referring to FIG. 3, the biometric information on the contractee is uploaded to the communication entity system 30.

According to the first exemplary embodiment, the biometric information is image data on the face of the contractee, image date on the iris of the contractee, image data on the palm print of the contractee, or pattern data on the fingerprint of the contractee. The type of the biometric information to be acquired may be specified by the contractee or the communication entity.

According to the first exemplary embodiment, the biometric information that the communication terminal 10 loaded with the SIM card 20 is enabled to acquire is an acquisition target. In other words, the biometric information that the communication terminal 10 is not enabled to acquire is excluded from the target range of the SIM information writing terminal 40. For example, if the camera module 107 (see FIG. 2) does not support a mode to photograph an infrared image, the image data on the iris is excluded from the target range of the biometric information.

However, all the biometric information may set to be within the target range regardless of the performance features of the communication terminal 10 loaded with the SIM card 20.

According to the first exemplary embodiment, the information related to the biometric information is used to confirm that the user of the communication terminal 10 loaded with the SIM card 20 and the contractee of the SIM card 20 are the same person (the user is identical to the contractee). The information stored on the SIM card 20 is not necessarily the biometric information itself and may be a feature used in the authentication process of the contractee. The feature and the biometric information are an example of the information related to the biometric information. The information related to the biometric information acquired from the contractee is an example of first biometric information.

The SIM card 20 may be handed over to the contractee in the office where the SIM information writing terminal 40 is installed. The SIM card 20 may also be delivered to the contractee from the communication entity system 30 via postal service or delivery service. Referring to FIG. 3, the communication entity system 30 includes the SIM information writing terminal 40.

If the SIM card 20 is to be delivered to the contractee from the communication entity system 30, an application for the communication service is placed via the Internet 60. According to the first exemplary embodiment, one piece of information for the application may include the information related to the biometric information.

According to the first exemplary embodiment, the information related to the biometric information on the contractee is written on the SIM card 20 while the information related to the biometric information on the contractee is also uploaded to the communication entity system 30 and stored on a database (not illustrated) thereof. The disclosure is not limited to this procedure.

FIG. 4 illustrates the location where the information related to the biometric information on the contractee is stored.

In a pattern 1, the location where the information related to the biometric information on the contractee is to be written may be only a memory removable from the communication terminal 10. The memories removable from the communication terminal 10 include the SIM card 20 (FIG. 2) and the external memory 104 (FIG. 2).

In a pattern 2, the location where the information related to the biometric information on the contractee is to be written may be only a database (not illustrated) of the communication entity system 30.

In a pattern 3, the location where the information related to the biometric information on the contractee is to be written may be the memory removable from the communication terminal 10 and the database (not illustrated) of the communication entity system 30.

Figure 5:
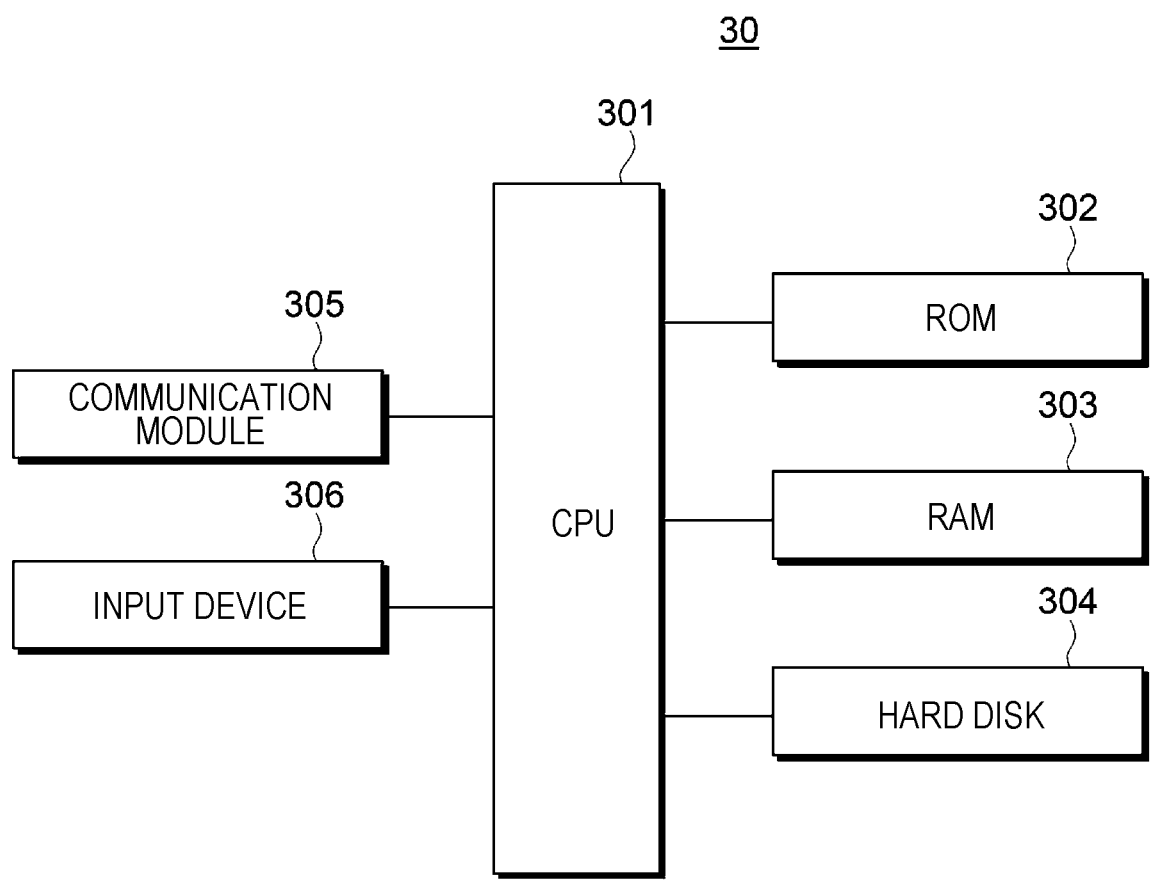
FIG. 5 illustrates an example of a hardware configuration of a communication entity system.

FIG. 5 illustrates a hardware configuration of the communication entity system 30.

Referring to FIG. 5, the communication entity system 30 is a single computer. Alternatively, the communication entity system 30 may be implemented by multiple computers that are operatively coupled. In other words, the communication entity system 30 may be a cloud system.

The communication entity system 30 in FIG. 5 includes a CPU 301, read-only memory (ROM) 302, random-access memory (RAM) 303, hard disk 304, communication module 305, and input device 306, and the like. The CPU 301 controls elements by executing a computer program. The ROM 302 stores basic input output system (BIOS). The RAM 303 is used as a working area. The hard disk 304 stores the SIM information and the information related to the biometric information on the contractees.

The communication module 305 has a function of performing communication with the network 50 and a function of performing communication via the Internet 60.

The communication entity system 30 of the first exemplary embodiment may be used to only store the SIM information on the contractee, or to store the SIM information on the contractee and the biometric information, or to only store the biometric information on the contractee.

The communication entity system 30 may determine whether the user of the communication terminal 10 (FIG. 1) loaded with the SIM card 20 and the contractee of the SIM card 20 are the same person and notify the communication terminal 10 of the determination results. Alternatively, the communication entity system 30 may supply to the communication terminal 10 the information related to the biometric information on the contractee to determine whether the user and the contractee are the same person.

Process Performed by the Terminal

Process performed by the terminal forming the network system 100 is described below.

Process Performed During the Contract of the Communication Service

Figure 6:
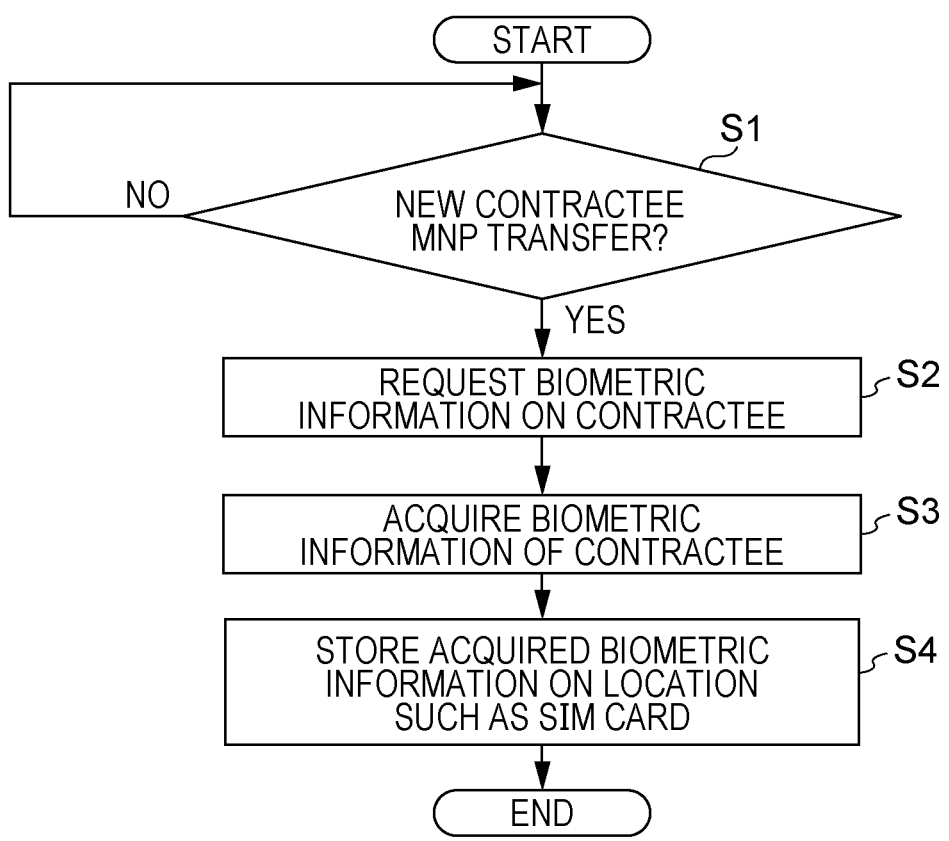
FIG. 6 is a flowchart illustrating a process that is performed on a SIM information writing terminal when a contract of a communication service provided by the communication entity is signed.

FIG. 6 is a flowchart illustrating the process that is performed by the SIM information writing terminal 40 (FIG. 3) when the contract for the communication service provided by the communication entity is signed. The letter S in FIG. 6 means step. The process in FIG. 6 is performed when a CPU (not illustrated) in the SIM information writing terminal 40 executes a computer program.

The SIM information writing terminal 40 determines whether the contract is a new contract or a mobile number portability (MNP) transfer. The NMP transfer means that an application for the communication service operated by the communication entity is received using a telephone number used in another communication entity.

While the no path is followed in step S1, the CPU in the SIM information writing terminal 40 repeats a determination operation in step S1.

If the yes path is followed in step S1, the CPU in the SIM information writing terminal 40 requests the biometric information from the contractee (step S2).

The request is displayed on a display screen (not illustrated). According to the first exemplary embodiment, the requested biometric information is the image data on the face of the contractee, image date on the iris of the contractee, image data on the palm print of the contractee, or pattern data on the fingerprint of the contractee. Which biometric information to be stored may be specified by the communication entity or the contractee. Multiple pieces of the biometric information may be acquired from a single contractee. For example, all of the image data on the face of the contractee, image date on the iris of the contractee, image data on the palm print of the contractee, and pattern data on the fingerprint of the contractee may be acquired.

Multiple pieces of the biometric information concerning one type may be acquired. For example, concerning the pattern data on the fingerprint, multiple pieces of pattern data on one finger may be acquired or multiple pieces of pattern data on multiple fingers may be acquired, A person in charge after verifying the request prepares the acquisition of the biometric information in response to the biometric information serving as an acquisition target. When the acquisition of the biometric information is ready, the CPU in the SIM information writing terminal 40 acquires the biometric information on the contractee (step S3).

If the biometric information as an acquisition target is the image data on the face or iris of the contractee, the SIM information writing terminal 40 acquires the image data on the face or iris of the contractee from a camera. If the biometric information as an acquisition target is the pattern data on the fingerprint of the contractee, the SIM information writing terminal 40 acquires the pattern data of the fingerprint of the contractee from a fingerprint sensor.

The CPU in the SIM information writing terminal 40 stores the acquired biometric information on a location, such as the communication entity system 30 (step S4). The locations are listed as patterns 1 through 3 in FIG. 4. The biometric information is not limited to the acquired biometric information. The biometric information may be a feature extracted from the biometric information.

Process Performed after the Start of the Provision of the Communication Service

Referring to FIGS. 7 through 17, a process example performed when the SIM information is written on the SIM card 20 (FIG. 1) serving as a physical medium is described.

The SIM card 20 (FIG. 1) may be illegally acquired from a communication terminal 10 (FIG. 1) found by somebody after being lost or missing, mounted on a communication terminal 10 of another person, and then used in communication involving the SIM information.

This is because there is no mechanism that confirms that the user of the communication terminal 10 is identical to the contractee tied to the SIM card 20. In the following discussion, the contractee tied to the SIM card 20 is also referred to as the contractee of the SIM card 20.

According to the first exemplary embodiment, unauthorized use of the SIM card 20 is controlled by confirming, before the start of the use of the communication service involving the SIM information, that the user of the communication terminal 10 is identical to the contractee of the SIM card 20.

Process examples of confirming that the user of the communication terminal 10 is identical to the SIM card 20 are described below. The process examples are performed by the communication terminal 10 alone or by the communication terminal 10 and the communication entity system 30 (FIG. 30).

Process Examples Performed by the Communication Terminal 10 Alone

Process Example 1

Figure 7:
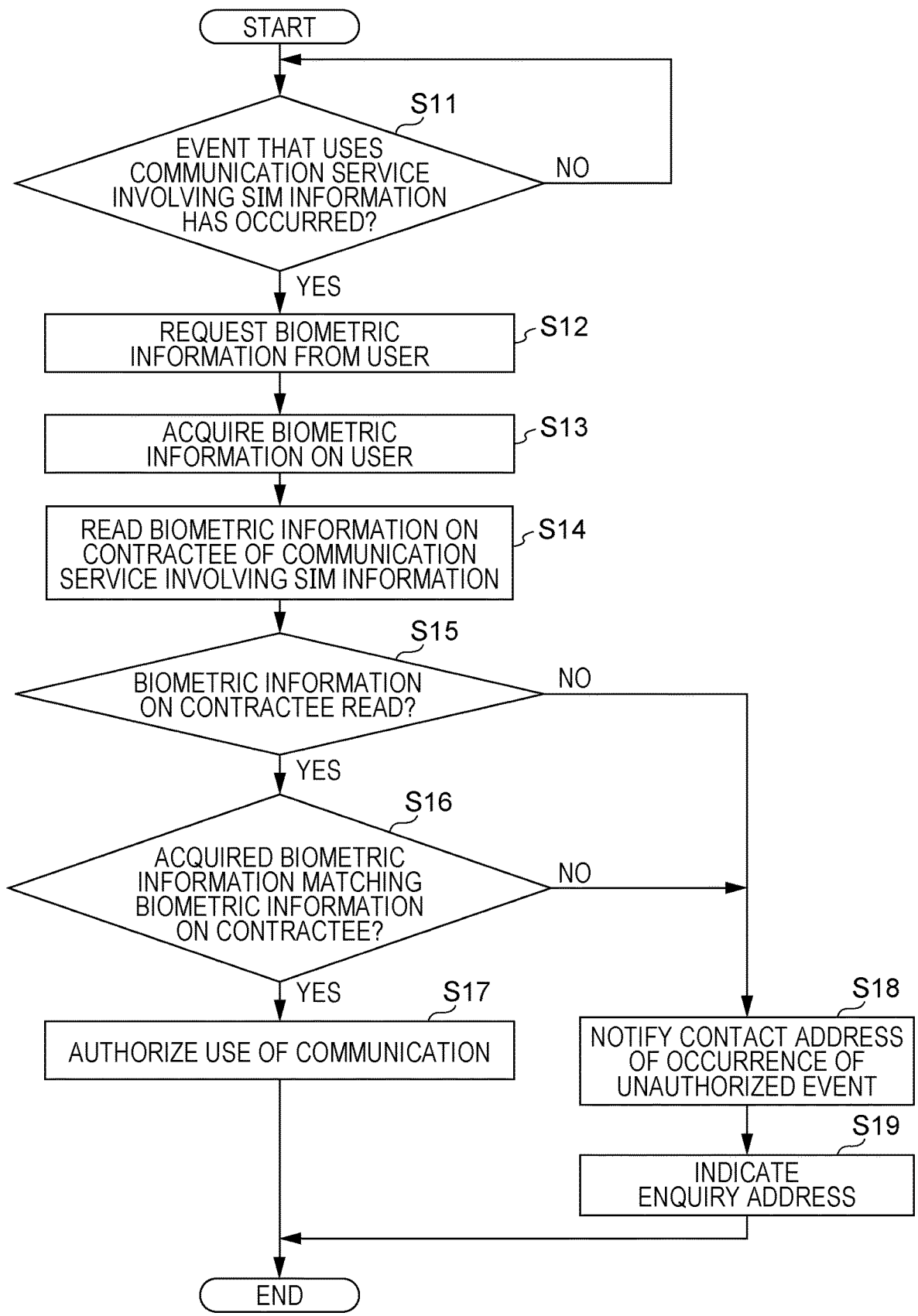
FIG. 7 is a flowchart illustrating a process that is performed to confirm that a user of the communication terminal and a contractee are the same person.

FIG. 7 is a flowchart illustrating a process example 1 of the communication terminal 10 (FIG. 1) to confirm that the user is identical to the contractee. The process in FIG. 7 is performed when the CPU 101 (FIG. 2) in the communication terminal 10 executes a computer program. The computer program is stored on the internal memory 102 (FIG. 2) and the internal memory 103 (FIG. 2).

The process is based on the premise that the information related to the biometric information on the contractee is stored on either the external memory 104 (FIG. 2) of the communication terminal 10 or the SIM card 20 (FIG. 2) or on both the external memory 104 of the communication terminal 10 and the SIM card 20. The SIM information is stored on the SIM card 20.

The CPU 101 determines whether an event of using the communication service involving the SIM information has occurred (step S11).

If an event starting Wi-Fi (registered trademark) communication or communication via a USB cable has occurred, the CPU 101 follows the no path from step S11. If the no path is followed, the CPU 101 repeats the operation in step S11.

If the user of the communication terminal 10 has performed an operation using the communication service involving the SIM information, the CPU 101 follows the yes path from step S11. If the operation is an operation to instruct the use of telephone, an operation to instruct the use of a short message service, or an operation to switch off an airplane mode or a vehicle mode, the yes path is followed in step S11.

The operations to instruct the use of the telephone include an operation to open a screen used to enter a phone number for calling, an operation to instruct to call a phone number as a contact address, an operation to call a phone number as a contact address selected in an address book, and an operation to instruct to respond to an incoming call.

The operations to instruct to use a short message service include an operation to instruct to start up the short message service, an operation to open the screen used to enter a message with the phone number as the contact address, an operation to instruct to transmit the message to the phone number as the contact address, and an operation to open the screen used to verify the contents of the message to the phone number as the contact address.

The operation to switch off the airplane mode or vehicle mode is an operation to permit the communication terminal 10 to transmit a radio wave. According to the first exemplary embodiment, firmware performs control to force the airplane mode or vehicle mode to be on until it is confirmed that the user of the communication terminal 10 is identical to the contractee of the SIM card 20. With the airplane mode or vehicle mode on, a communication, such as Wi-Fi communication, not involving the SIM information is possible. For example, the Internet is available.

If the yes path is followed in step S11, the CPU 101 request the biometric information from the user (step S12). The contents or type of the requested biometric information is read from the SIM card 20 and indicated to the user. For example, the display on the touch panel 106 (FIG. 2) is switched to the image captured by the camera module 107 and a target image is indicated.

If an acquisition condition is satisfied, the CPU 101 acquires the biometric information on the user (step S13). The biometric information acquired from the user of the communication terminal 10 is an example of second biometric information. The biometric information acquired from the user of the communication terminal 10 includes the information related to the biometric information.

The CPU 101 reads the biometric information on the contractee of the communication service involving the SIM information (step S14). In this case, the biometric information is read from the SIM card 20 or the external memory 104. The operation in step S14 may be performed prior to step S12 or step S13 if the yes path is followed in step S11.

The CPU 101 determines whether the biometric information on the contractee has been read (step S15). If the biometric information on the contractee is stored on either the SIM card 20 or the external memory 104 or on both the SIM card 20 and the external memory 104, the CPU 101 follows the yes path in step S15.

If the yes path is followed in step S15, the CPU 101 determines whether the biometric information acquired in step S13 matches the biometric information on the contractee (step S16).

If the yes path is followed in step S16, the CPU 101 authorizes the use of the communication service involving the SIM information (step S17). For example, the CPU 101 performs control to transition the airplane mode from off to on. According to the first exemplary embodiment, the firmware performs control to keep the communication terminal 10 to the airplane mode until it is confirmed that the user is identical to the contractee.

If the biometric information on the contractee is not stored on the communication terminal 10 or the acquired biometric information fails to match the biometric information on the contractee, the CPU 101 follows the no path in step S15 or S16.

The no path is followed in step S15 if the SIM card 20 is loaded to a different communication terminal 10 with the biometric information on the contractee stored only on the external memory 104. Also, the no path is followed in step S15 if the external memory 104 storing the biometric information on the contractee is pulled out of the communication terminal 10 when the biometric information on the contractee is stored only on the external memory 104.

The no path is followed in step S16 if the biometric information on the contractee stored on the SIM card 20 fails to match the biometric information acquired from the user of the communication terminal 10 loaded with an illegally acquired SIM card 20. This is based on the premise that the SIM card 20 stores the biometric information on the contractee.

If the no path is followed in step S15 or S16, the CPU 101 notifies a pre-registered contact address of the occurrence of an authorized event (step S18). Communication not using the SIM information is used for this notification. For example, the Internet 60 connected via Wi-Fi interface is used for the notification.

The contact addresses may include one or more mail addresses set by the contractee, mail address of a support center of the communication entity, and/or uniform resource locator (URL) of the communication entity.

The mail addresses as a contact address may include a mail address of the contractee and mail addresses of parents or acquaintance. If the SIM card 20 is based on a corporate contract, the mail address of the contact address is a mail address of the administrator of a corporation. These pieces of information are stored on the SIM card 20.

The contact method is not limited to the transmission of mails. The mail is not necessarily transmitted as a document. For example, code or information indicating the occurrence of an event that fails to confirm that the user is identical to the contractee may be transmitted.

According to the first exemplary embodiment, subsequent to step S18, the CPU 101 indicates an enquiry address to the user (step S19). For example, the enquiry address is a phone number or URL of the support center of the communication entity.

According to the first exemplary embodiment, if the user selects calling the support center, the CPU 101 temporarily authorizes the use of the communication service involving the SIM information, allowing communication with a person in charge in the support center. A support service is thus provided to the contractee.

The enquiry address may include information on an individual having the authorization to manage the biometric authorization. Whether to indicate the information on the individual is decided by the contractee.

Figure 8:
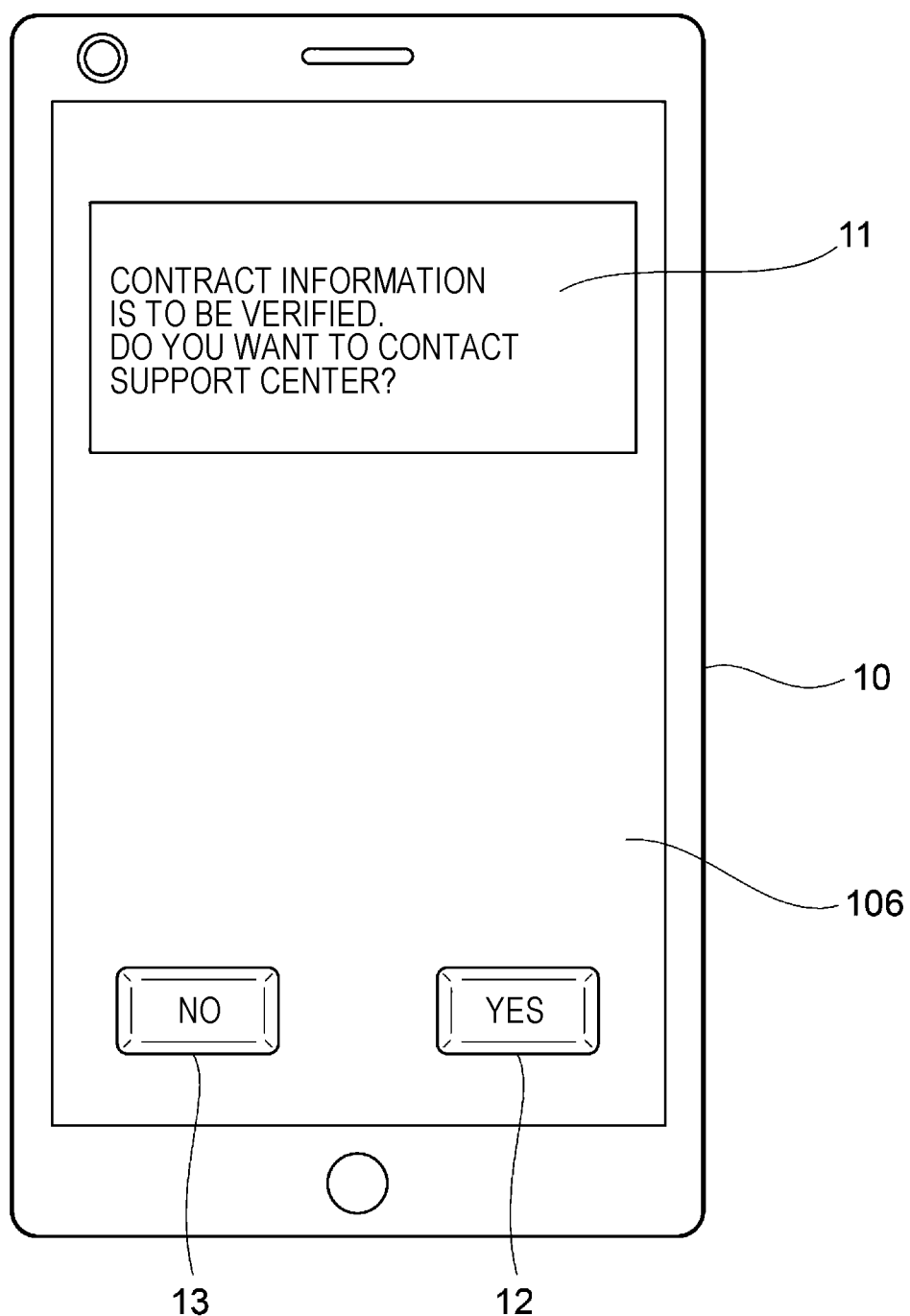
FIG. 8 illustrates a display example of an enquiry address.

FIG. 8 illustrates a display example of the enquiry address. Referring to FIG. 8, the touch panel 106 of the communication terminal 10 displays sentences 11 reading "Contract information is to be verified. Do you want to contact support center ?."

When a yes button 12 is tapped, the support center may be called or a phone number may be displayed. Calling may be performed via the communication service that involves the temporarily released SIM information. The calling destination is the support center and is thus free from unauthorized use. When the yes button 12 is tapped, accessing the URL of the support center may be performed or a URL with hyperlink may be displayed. The accessing may be performed via the Internet in a manner free from the use of the SIM information.

If a no button 13 is tapped, the screen displaying the sentences 11 is closed.

Figure 9:
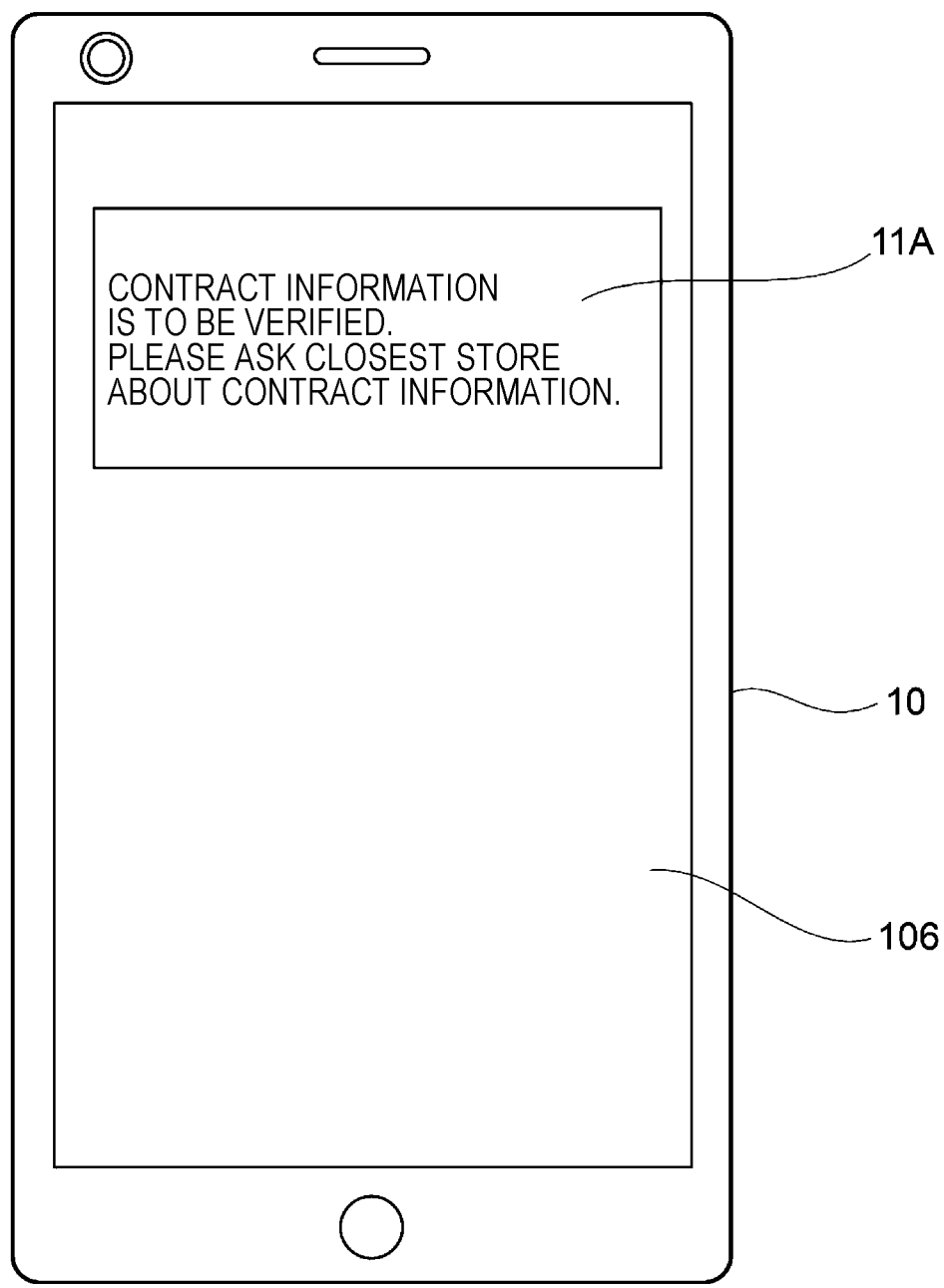
FIG. 9 illustrates another display example of the enquiry address.

FIG. 9 illustrates another display example of the enquiry address.

Referring to FIG. 9, the touch panel 106 of the communication terminal 10 displays sentences 11A reading "Contract information is to be verified. Please ask closest store about contract information."

In this case, the screen indicating the sentences 11A is closed by the CPU 101 when a predetermined time has elapsed.

Process Example 2

Figure 10:
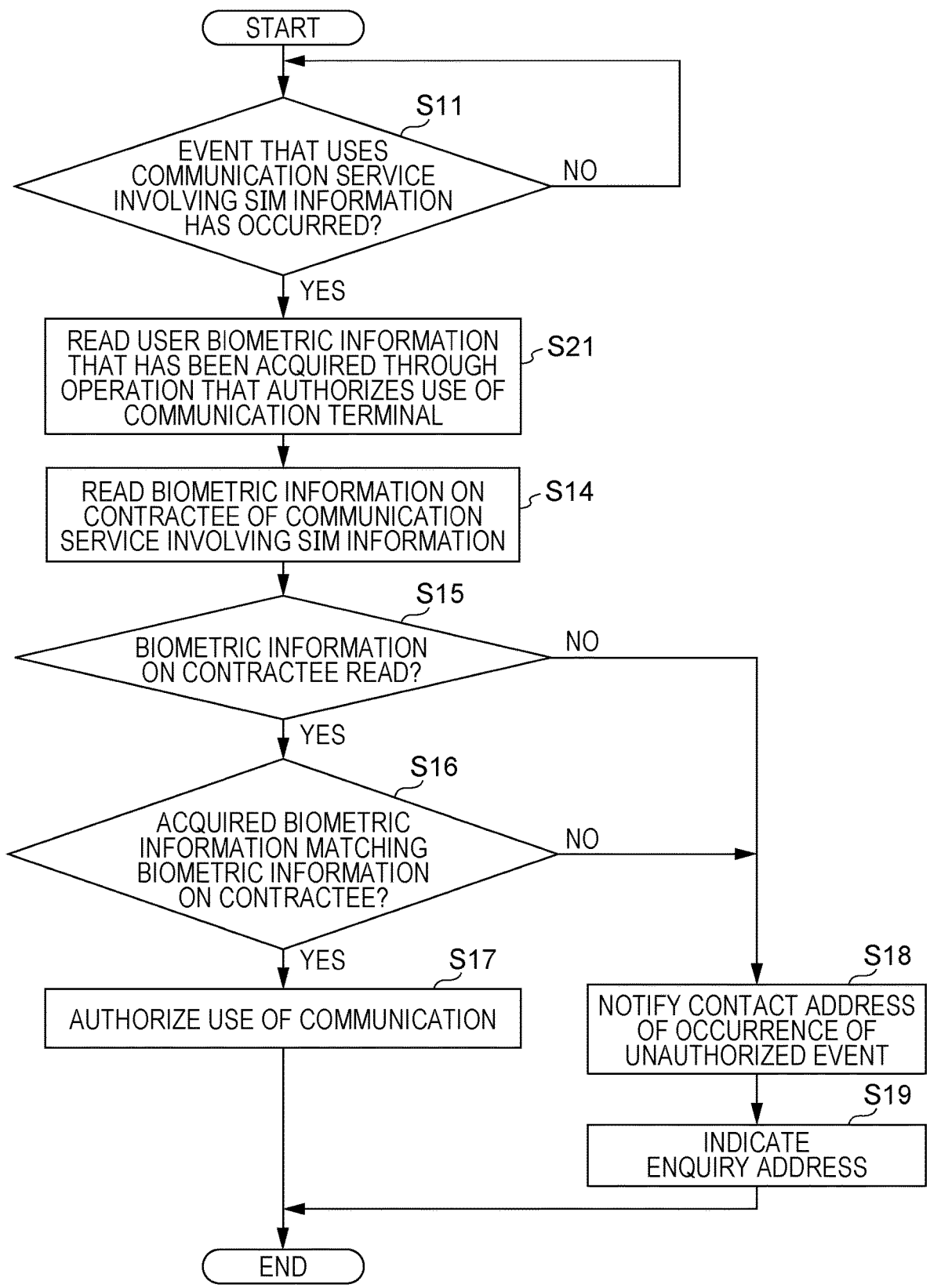
FIG. 10 is a flowchart illustrating another example of the process that is performed to confirm that the user of the communication terminal and the contractee are the same person.

FIG. 10 is a flowchart illustrating a process example 2 that is performed to confirm that the user of the communication terminal 10 (FIG. 1) and the contractee are the same person. Referring to FIG. 10, elements identical to those in FIG. 7 are designated with the same step numbers.

The difference between the process example 1 (FIG. 7) and the process example 2 is that step S21 is performed in place of steps S12 and S13.

In step S21, the CPU 101 reads the biometric information on the user that has been acquired in the operation to authorize the use of the communication terminal 10. Step S21 is different from steps S12 and S13 in that the objective of acquiring the biometric information on the user is to use the communication terminal 10.

If the biometric information on the user is not acquired in an operation to authorized the use of the communication terminal 10, the CPU 101 performs the process example 1. This is because the biometric information on the user is not read in step S21.

The biometric information on the user is difficult to read when a pattern connecting nine points arranged in three rows by three columns is used to authorize the use of the communication terminal 10, when a personal identification number (PIN) code is used to authorize the use of the communication terminal 10, when a password is used to authorize the use of the communication terminal 10, when the touch panel 106 is swiped or tapped to authorize the use of the communication terminal 10, or when operation keys are pressed to authorize the use of the communication terminal 10.

The operation to authorize the use of the communication terminal 10 refers to the operation to transition from the state in which the touch panel 106 (FIG. 2) of the communication terminal 10 is turned off to the state in which the communication terminal 10 is ready to use.

The operation to authorize the use of the communication terminal 10 includes the operation to press a power key. If the fingerprint sensor 108 is arranged in the power key, the pattern data on the fingerprint is also acquired when the power key is pressed.

If the image data on the face or iris of the user is requested after pressing the power switch, the operation to acquire the image data on the face or iris of the user corresponds to the operation to authorize the use of the communication terminal 10.

The biometric information acquired in the operation to authorize the use of the communication terminal 10 is stored the internal memory 102 (FIG. 2) or the internal memory 103 (FIG. 3). The biometric information read in step S21 is the biometric information acquired to authorize the current use. In other words, the biometric information acquired to cancel the locked state of the screen locked at an immediately preceding cycle is read in step S21.

If the type of the biometric information on the contractee read in step S14 is different from the type of the biometric information acquired in the operation to authorize the use of the communication terminal 10, the CPU 101 requests prior to the determination operation in step S15 from the user the biometric information of the same type as the type of the stored biometric information on the contractee. FIG. 10 omits this operation.

The contents of the process in step S15 and thereafter are identical to those of the process example 1.

In the process example 2, if the type of the biometric information acquired in the operation to authorize the use of the communication terminal 10 is identical to the type of the biometric information on the contractee, the process example 2 is free from the re-acquisition of the same type of the biometric information to authorize the use of the communication service involving the SIM information.

Process Example 3

Figure 11:
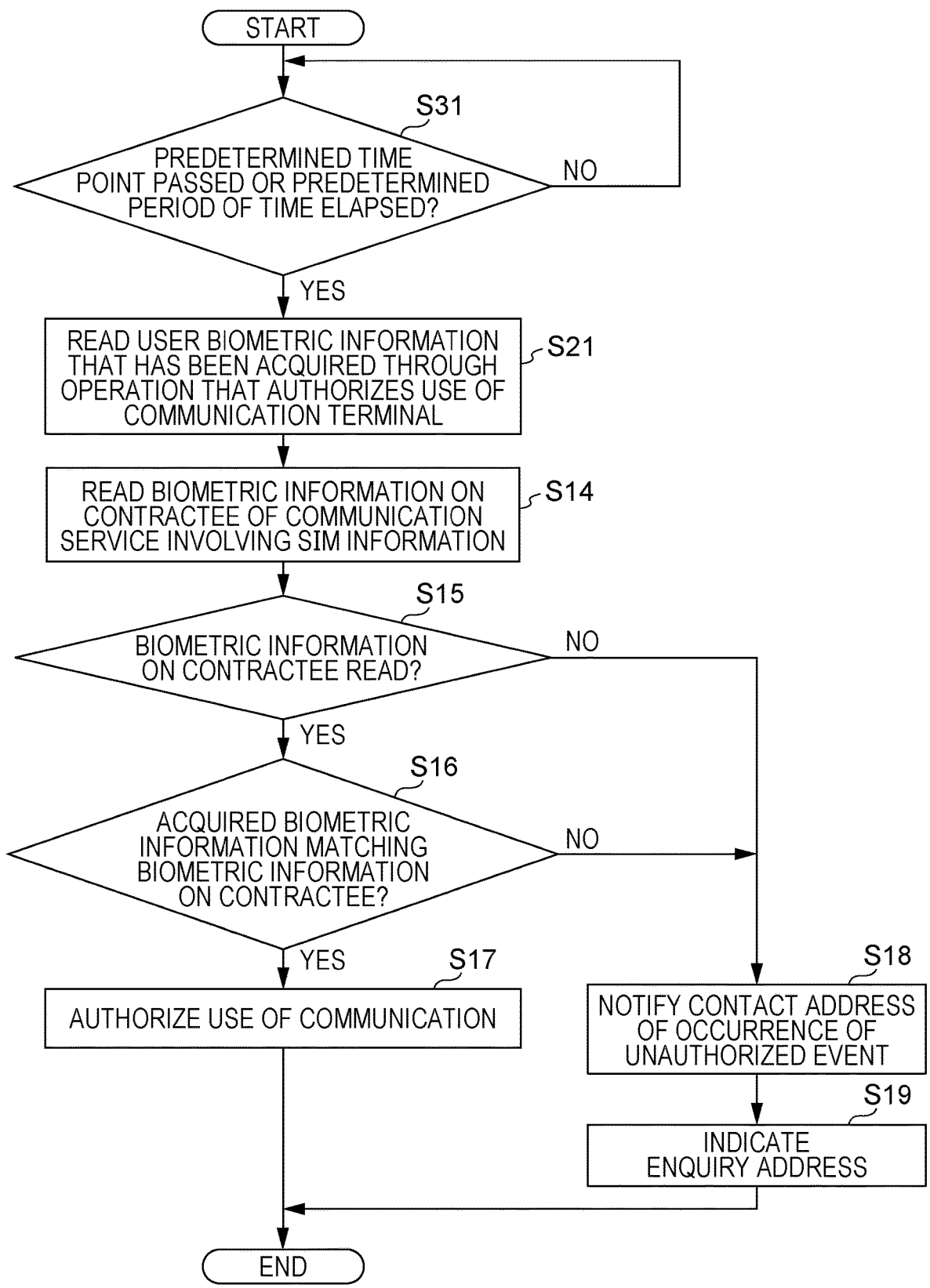
FIG. 11 is a flowchart illustrating another example of the process that is performed to confirm that the user of the communication terminal and the contractee are the same person.

FIG. 11 is a flowchart illustrating a process example 3 that is performed to confirm that the user of the communication terminal 10 (FIG. 1) and the contractee are the same person. In FIG. 11, steps identical those in FIG. 10 designated with the same step numbers.

The difference between the process example 3 and the process example 2 (FIG. 10) is that step S31 is substituted for step S11.

In step S31, the CPU 101 determines whether a predetermined time point has passed or a predetermined period of time has elapsed. In other words, the CPU 101 determines whether the user of the communication terminal 10 is identical to the contractee, without paying attention to the occurrence of an event that uses the communication service involving the SIM information. As long as the no path is followed in step S31, the CPU 101 repeats the operation in step S31. If the yes path is followed in step S31, the CPU 101 proceeds to step S21.

According to the first exemplary embodiment, the predetermined time point may be specific time, such as 8:00 every day, 10:00 every day, or 12:00 every day. The time point may be any time point and a time duration between the time point and another time point may be any time duration. For example, irregular time points, such as 8:00, 9:00, 10:15, and 14:45 every day, may be specified.

The number of time points within per day may be one or more. If the number of time points per day is plural, the number of times points within a time band per day may be varied. For example, the number of time points from 9:00 to 15:00 is six and the number of times points from 15:00 to 21:00 is four. The number of time points is thus varied depending on the time band within the day. How the time bands are set is described herein for exemplary purposes only.

According to the first exemplary embodiment, for example, the predetermined period of time serving as an elapsed time unit may be 30 minutes or 1 hour. The elapsed time starts at the moment when the communication terminal 10 is started up or when the lock state is canceled. In other words, the start time is when the communication terminal 10 becomes ready to use. Each time when the elapsed time satisfies the condition, a determination as to whether to authorize the use of the communication service involving the SIM information is made.

According to the first exemplary embodiment, an operation to confirm whether the user is identical to the contractee is performed without paying attention to the intension of the user to use the communication service involving the SIM information.

According to the first exemplary embodiment, the predetermined time point and the predetermined period of time serving as the elapsed time unit are stored on the SIM card 20.

The operations in step S31 and thereafter in the process example 3 are identical to those in step S21 and thereafter in the process example 2 (FIG. 10). Specifically, in order not to interfere with the use operation of the communication terminal 10, the biometric information on the user acquired in the operation to authorize the use of the communication terminal 10 is read to determine whether the user is identical to the contractee.

The operations in step S12 and thereafter in the process example 1 (FIG. 7) may be performed subsequent to step S31. In such a case, each time the yes path is followed in step S31, the biometric information on the user is acquired. The unauthorized use of the communication service may be more reliably controlled.

Process Example 4

Figure 12:
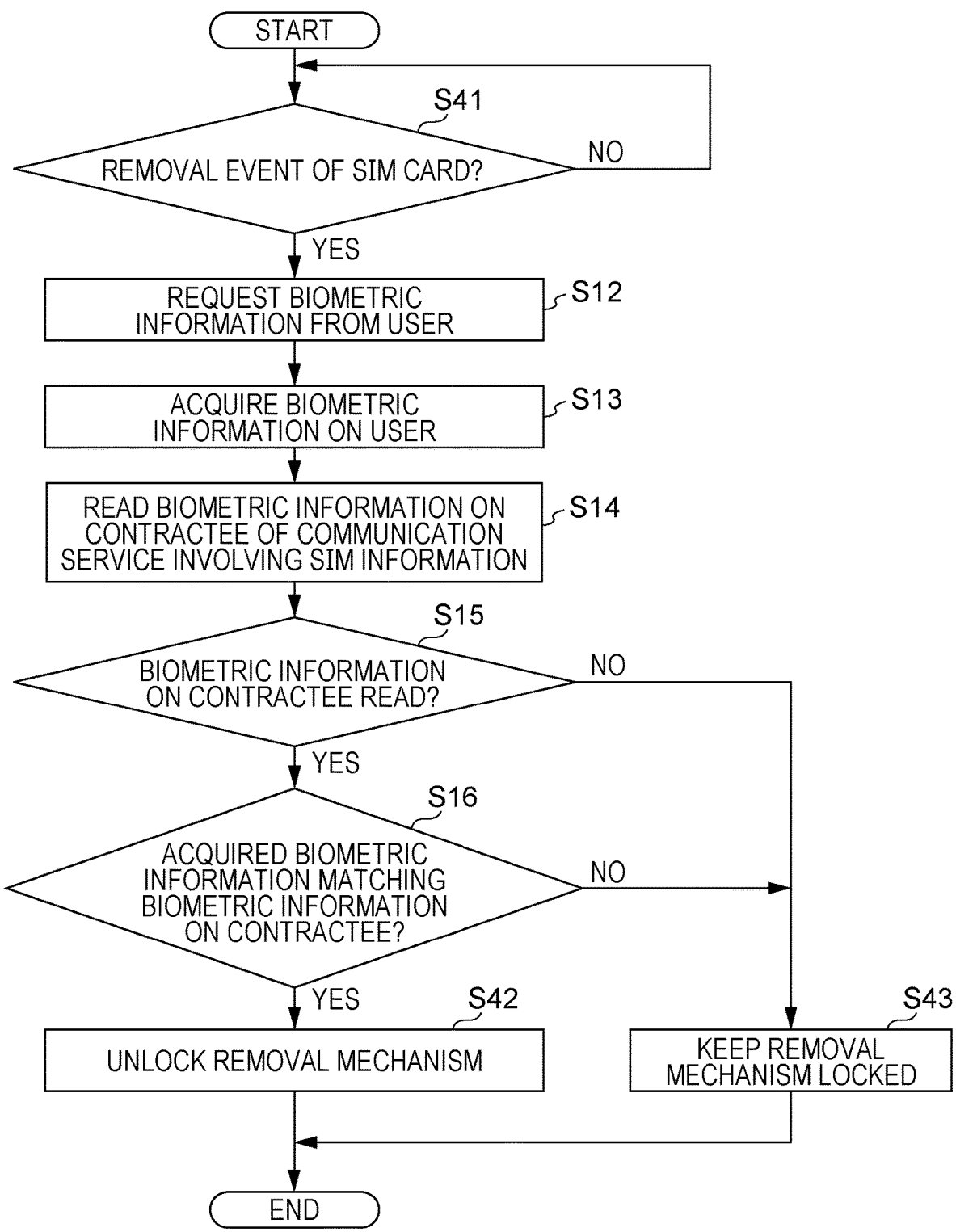
FIG. 12 is a flowchart illustrating another example of the process that is performed to confirm that the user of the communication terminal and the contractee are the same person.

FIG. 12 is a flowchart illustrating a process example 4 that is performed to confirm that the user of the communication terminal 10 (FIG. 1) and the contractee are the same person. In FIG. 12, steps identical to those in FIG. 7 are designated with the same step numbers.

In the process example 4 as well, a determination as to whether the user of the communication terminal 10 is identical to the contractee is made without paying attention to the occurrence of an event that uses the communication service involving the SIM information.

In the process example 4, the CPU 101 performs step S41 instead of step S11. In step S41, the CPU 101 determines whether user operation is an removal operation of the SIM card 20 (FIG. 1). This is performed to control the removal operation of the SIM card 20 by a third party (a person other than the contractee).

As long as the yes path is followed in step S41, the CPU 101 repeats the determination operation in step S41. If the yes path is followed in step S41, the CPU 101 proceeds to step S12.

In the process example 4, the CPU 101 determines the occurrence of the removal operation of the SIM card 20 by the user by referring to the presence or absence of a removal instruction of the SIM card 20 on a screen displayed on the touch panel 106 (FIG. 2). Alternatively, the CPU 101 may determine the occurrence of the removal operation of the SIM card 20 by the user by referring to the occurrence of the removal operation of a tray used to removably mount the SIM card 20 on the communication terminal 10. A sensor (not illustrated) is used to detect the removal operation of the tray.

The removal operations of the tray include a removal button operation of the SIM card 20, a removal operation to remove a cover covering a portion that receives the SIM card 20, and a cancel operation to cancel the lock state by pushing the SIM card 20 into the communication terminal 10. A sensor (not illustrated) is also used to detect one of these operations.

If the yes path is followed in step S41, the CPU 101 requests the biometric information from the user (step S12) and acquires the biometric information on the user (step S13) in the same way as in the process example 1. The CPU 101 reads the biometric information on the contractee for the communication service involving the SIM information (step S14) and performs the determination operations in step S15 and/or S16.

If the yes path is followed in step S16 in the process example 4, the CPU 101 cancels the lock state of a removal mechanism (step S42). If the no path is followed in step S15 or S16, the CPU 101 keeps the removal mechanism locked (step S43). If the removal mechanism is unlocked, the SIM card 20 is removable. On the other hand, if the removal mechanism is kept locked, the removal of the SIM card 20 is physically blocked.

If the SIM card 20 is installed on the communication terminal 10 in the process example 4, the removal mechanism is mechanically or electrically locked.

Subsequent to step S43, the CPU 101 may display on the touch panel 106 of the communication terminal 10 a guidance that enables the SIM card 20 to be removable. In a way similar to the process example 1, an unauthorized removal of the SIM card 20 may be notified to the registered contact address.

Figure 13A:
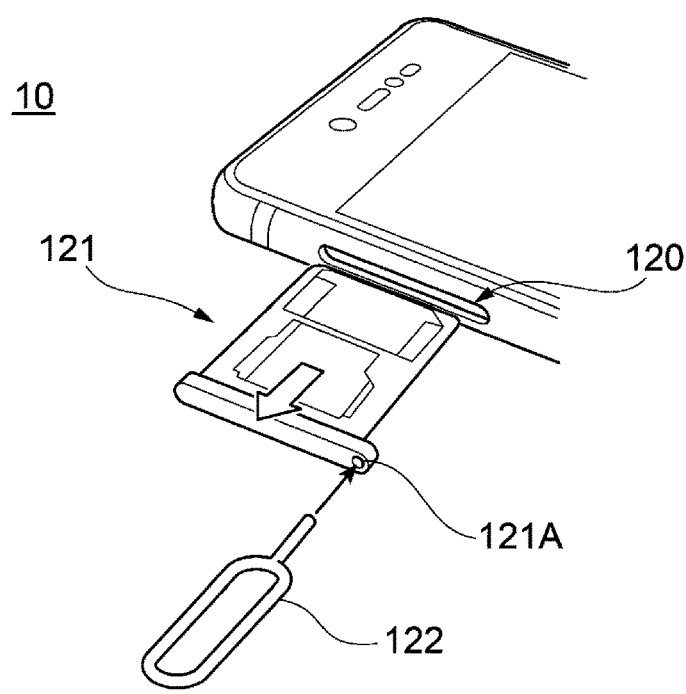
Figure 13B:
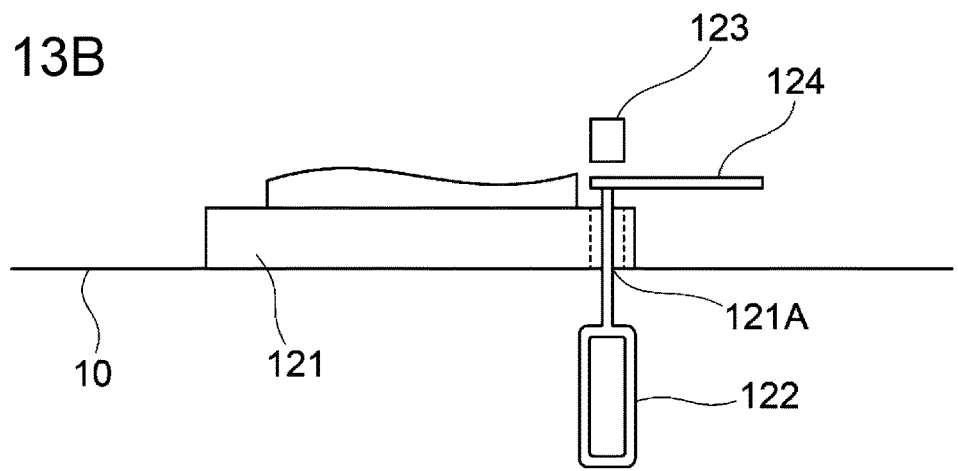
Figure 13C:
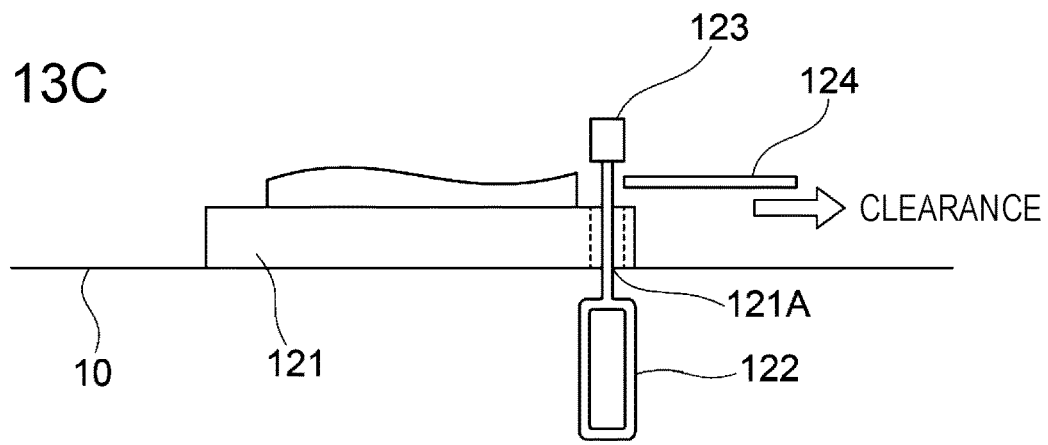

FIGS. 13A through 13C illustrate an example of the removal mechanism. FIG. 13A illustrates a tray 121 on which the SIM card 20 is mounted. FIG. 13B illustrates the removal mechanism in a locked state. FIG. 13C illustrates the removal mechanism in an unlocked state.

The tray 121 in FIGS. 13A through 13C is adapted to be inserted into a slot 120 arranged on a side of the communication terminal 10. A switch 123 to cancel the locked state caused by friction of the SIM card 20 is thus operable by pushing a pin 122 into a hole 121A formed in the lid of the tray 121.

A plate member 124 is mounted between the hole 121A and the switch 123 in a manner free to push and pull in the communication terminal 10 as in FIGS. 13A through 13C. If the removal of the SIM card 20 is authorized, the plate member 124 is cleared of a path of the tip of the pin 122. The tip of the pin 122 is thus enabled to operate the switch 123. To hinder the removal of the SIM card 20, the plate member 124 blocks the path of the tip of the pin 122 as illustrated in FIG. 12B such that the tip of the pin 122 does not push the switch 123.

The process example 4 may be combined with any of the process examples 1 through 3.

Process Example 5

Figure 14:
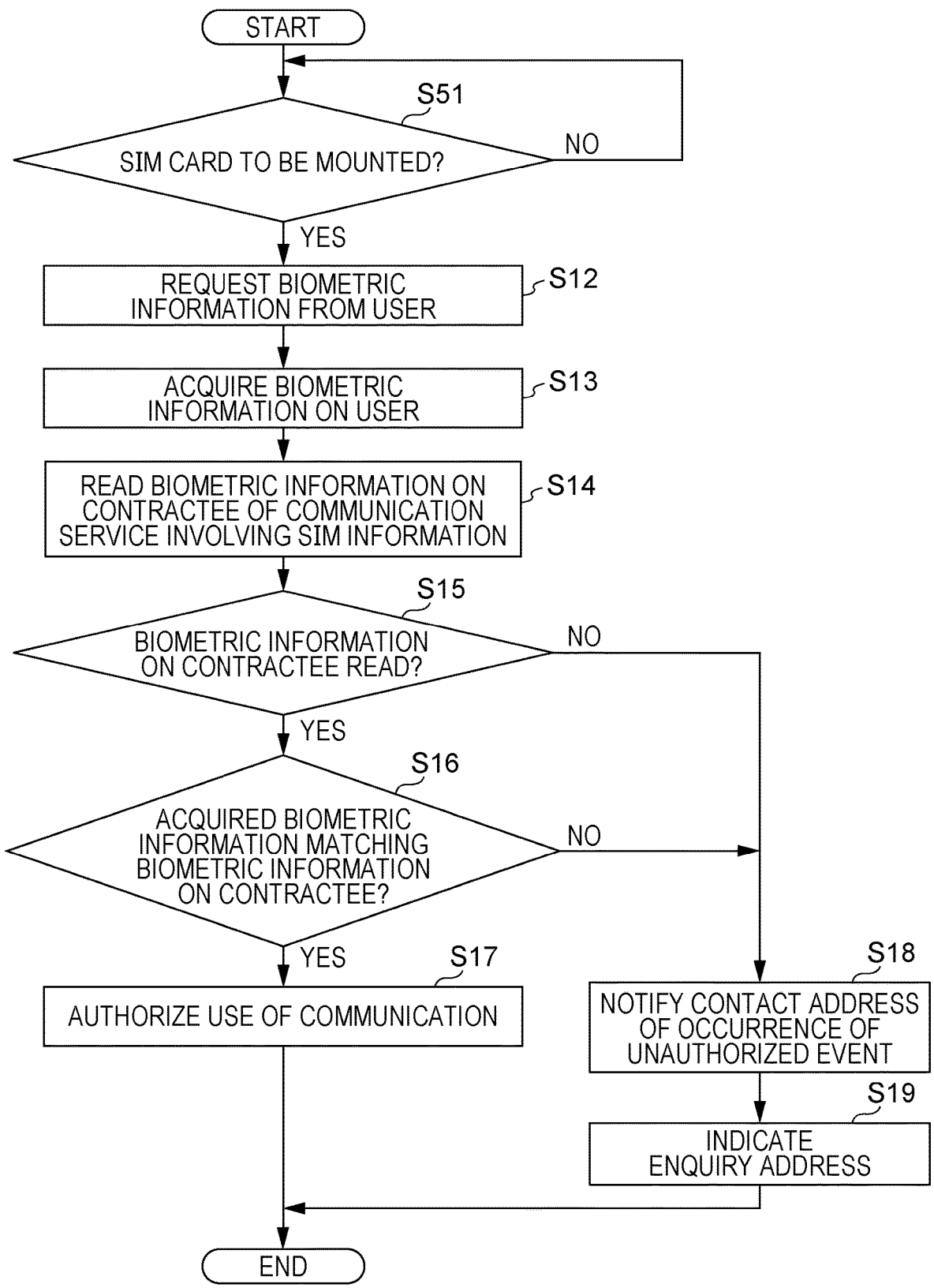
FIG. 14 is a flowchart illustrating another example of the process that is performed to confirm that the user of the communication terminal and the contractee are the same person.

FIG. 14 is a flowchart illustrating a process example 5 that is performed to confirm that the user of the communication terminal 10 and the contractee are the same person. In FIG. 14, steps identical to those in FIG. 7 are designated with the same step numbers.

In the process example 4 previously described, a determination as to whether the user of the communication terminal 10 is identical to the contractee is made at the removal timing of the SIM card 20 from the communication terminal 10. In the process example 5, a determination as to whether the user of the communication terminal 10 is identical to the contractee is made at the timing when the SIM card 20 is mounted on the communication terminal 10.

In the process example 5, the CPU 101 performs step S51 instead of step S11. In step S51, the CPU 101 determines whether the user operation is the mounting of the SIM card 20. This is performed to control an authorized mounting of the SIM card 20 by a third party (a person other than the contractee).

While the no path is followed in step S51, the CPU 101 repeats the operation in step S51. If the yes path is followed in step S51, the CPU 101 proceeds to step S12.

In the process example 5, the occurrence of the event in which the SIM card 20 is mounted by the user is based on the premise that the communication terminal 10 is in a power-on state. The power-on state includes a locked state or a sleep state, in which the touch panel 106 is in a light-off mode. In the process example 5, the CPU 101 detects the operation to mount the SIM card 20 on the communication terminal 10 as an operation to request the communication terminal 10 to operate.

If the yes path is followed in step S51, the CPU 101 performs the operation in step S12 in the same way as in the process example 1. The contents of the operations in step S12 and thereafter remain unchanged from those of the process example 1 and the discussion thereof is omitted herein.

The process example 5 may be combined with any of the process examples 1 through 4.

Process Examples Implemented by Both the
Communication Terminal 10 and the
Communication Entity System 30 Operating in
Cooperation With Each Other Process Example 6

Figure 15:
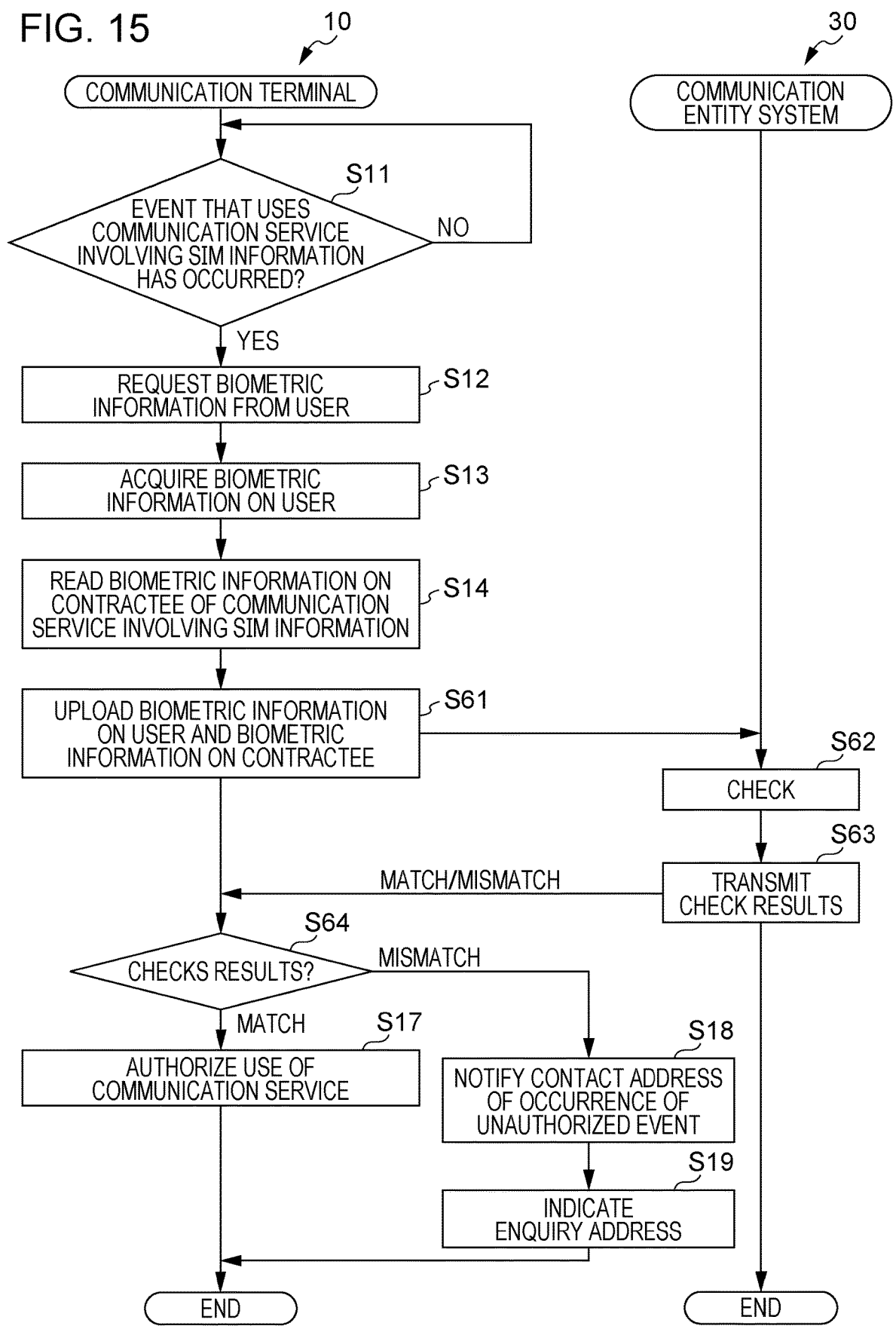
FIG. 15 is a flowchart illustrating another example of the process that is performed to confirm that the user of the communication terminal and the contractee are the same person.

FIG. 15 is a flowchart illustrating a process example 6 that is performed to confirm that the user of the communication terminal 10 and the contractee are the same person. In FIG. 15, steps identical to those in FIG. 7 are designated with the same step numbers.

In the process examples 1 through 5, the determination as to whether the user is identical to the contractee is performed by the communication terminal 10. In the process example 6, the determination as to whether the user is identical to the contractee is performed by the communication terminal 10 and the communication entity system 30 operating in cooperation with each other.

The process example 6 is started by the communication terminal 10. If the CPU 101 in the communication terminal 10 detects the event to use the communication service involving the SIM information in FIG. 15, the previously described operations in steps S11 through S14 are performed.

When the biometric information on the user of the communication terminal 10 is acquired and the biometric information on the contractee is read, the CPU 101 uploads the biometric information on the user and the biometric information on the contractee to the communication entity system 30 (step S61). The Internet is used herein to upload the biometric information. In other words, a communication service, such as Wi-Fi, not involving the SIM information is used in the communication prior to confirming that the user is identical to the contractee.

The CPU 301 (FIG. 5) in the communication entity system 30 checks the uploaded biometric information on the user against the biometric information on the contractee (step S62). This checking may be performed by checking the serial number of the communication terminal 10 registered on the SIM card 20 against the serial number of the communication terminal 10 serving as an upload source. By also checking the serial numbers, an unauthorized use of the SIM card 20 may be more easily detected than when the matching of the biometric information is determined by the communication terminal 10 alone as in the process examples 1 through 5.

When the check results are obtained, the CPU 301 in the communication entity system 30 transmits the check results to the communication terminal 10 serving as the upload source (step S63). The check results contain a match and a mismatch.

The communication terminal 10 having received the check results determines whether the check results are a match or a mismatch (step S64). If the check results are a match, the CPU 101 in the communication terminal 10 authorizes the use of the communication service (step S17). If the check results are a mismatch, the CPU 101 notifies the registered contact address of the occurrence of an unauthorized event (step S18) and indicates the enquiry address (step S19).

In the process example 6, the CPU 301 in the communication entity system 30 is involved in confirming that the user is identical to the contractee. If an unauthorized program installed on the communication terminal 10 starts the communication service involving the SIM information on the communication terminal 10, the communication entity system 30 may take an action, such as stopping communication. For example, based on the check results in step S63, the communication service involving the SIM information may be stopped.

In the above discussion, the process example 6 is combined with the process example 1 but may be combined with any of the process examples 2 through 5.

Process Example 7

Figure 16:
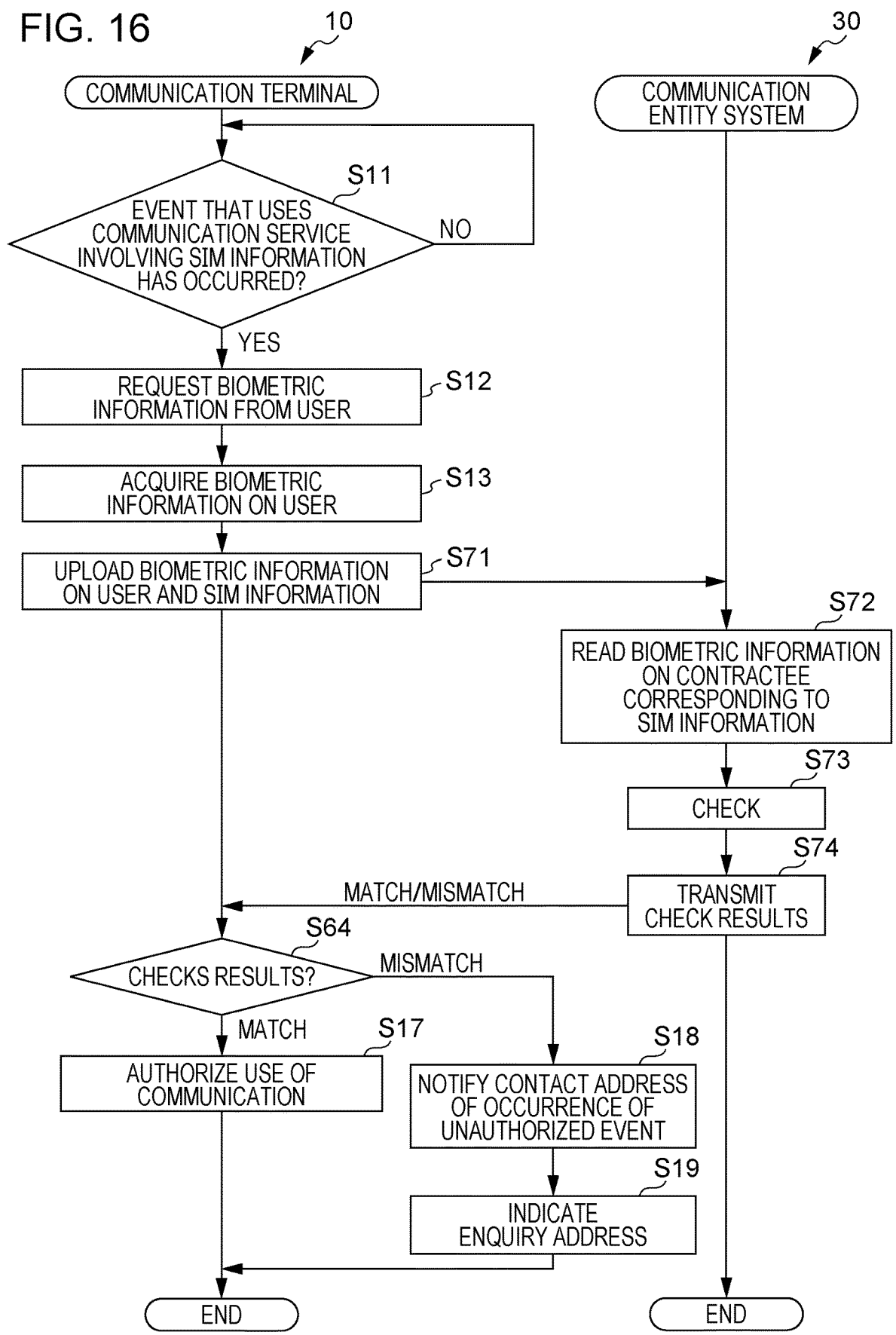
FIG. 16 is a flowchart illustrating another example of the process that is performed to confirm that the user of the communication terminal and the contractee are the same person.

FIG. 16 is a flowchart illustrating a process example 7 that is performed to confirm that the user of the communication terminal 10 and the contractee are the same person. In FIG. 16, steps identical to those in FIG. 15 are designated with the same step numbers.

In the process example 7, the determination as to whether the user is identical to the contractee is performed by the communication terminal 10 and the communication entity system 30 operating in cooperation with each other. In the process example 7, the biometric information on the contractee is stored on the communication entity system 30. Additionally, the biometric information on the contractee may be stored on the SIM card 20.

The process example 6 is started by the communication terminal 10. If the CPU 101 in the communication terminal 10 detects the event to use the communication service involving the SIM information in FIG. 16, the previously described operations in steps S11 through S13 are performed. Since the biometric information on the contractee is stored on the communication entity system 30, the operation in step S14 (FIG. 15) is omitted.

Even if the biometric information on the contractee is stored on the communication terminal 10, the biometric information on the contractee stored on the communication entity system 30 is used in the process example 7.

If the biometric information on the user of the communication terminal 10 is acquired, the CPU 101 uploads the biometric information on the user and the SIM information to the communication entity system 30 (step S71).

The Internet is used herein to upload the biometric information. In other words, a communication service, such as Wi-Fi, not involving the SIM information is used in the communication prior to confirming that the user is identical to the contractee.

Upon confirming the uploading, the CPU 301 (FIG. 5) in the communication entity system 30 reads the biometric information on the contractee corresponding to the uploaded SIM information (step S72).

The CPU 301 (FIG. 5) in the communication entity system 30 checks the uploaded biometric information on the user against the read biometric information on the contractee (step S73). This checking may include checking the serial number of the communication terminal 10 registered on the SIM card 20 against the serial number of the communication terminal 10 serving as an upload source.

When the check results are obtained, the CPU 301 in the communication entity system 30 transmits the check results to the communication terminal 10 serving as the upload source (step S74). The check results contain a match and a mismatch.

The communication terminal 10 having received the check results performs the operations in steps S64 and S17 through S19 in the same way as in the process example 6 (FIG. 15).

In the process example 7, the biometric information on the contractee stored on the communication entity system 30 is used. This may make it more difficult to spoof the contractee's identity than when the biometric information on the contractee is uploaded from the communication terminal 10. Since the biometric information on the contractee is not stored on the SIM card 20, an unscrupulous third person may have difficulty accessing the biometric information on the contractee on a communication terminal 10 that may be found by someone after being lost.

In the process example 7, the CPU 301 in the communication entity system 30 is involved in confirming that the user is identical to the contractee. If an unauthorized program installed on the communication terminal 10 starts the communication service involving the SIM information on the communication terminal 10, the communication entity system 30 may take an action, such as stopping communication. For example, based on the check results in step S74, the communication service involving the SIM information may be stopped.

In the above discussion, the process example 7 is combined with the process example 6 in view of the process example 1 but may be combined with any of the process examples 2 through 5.

Process Example 8

Figure 17:
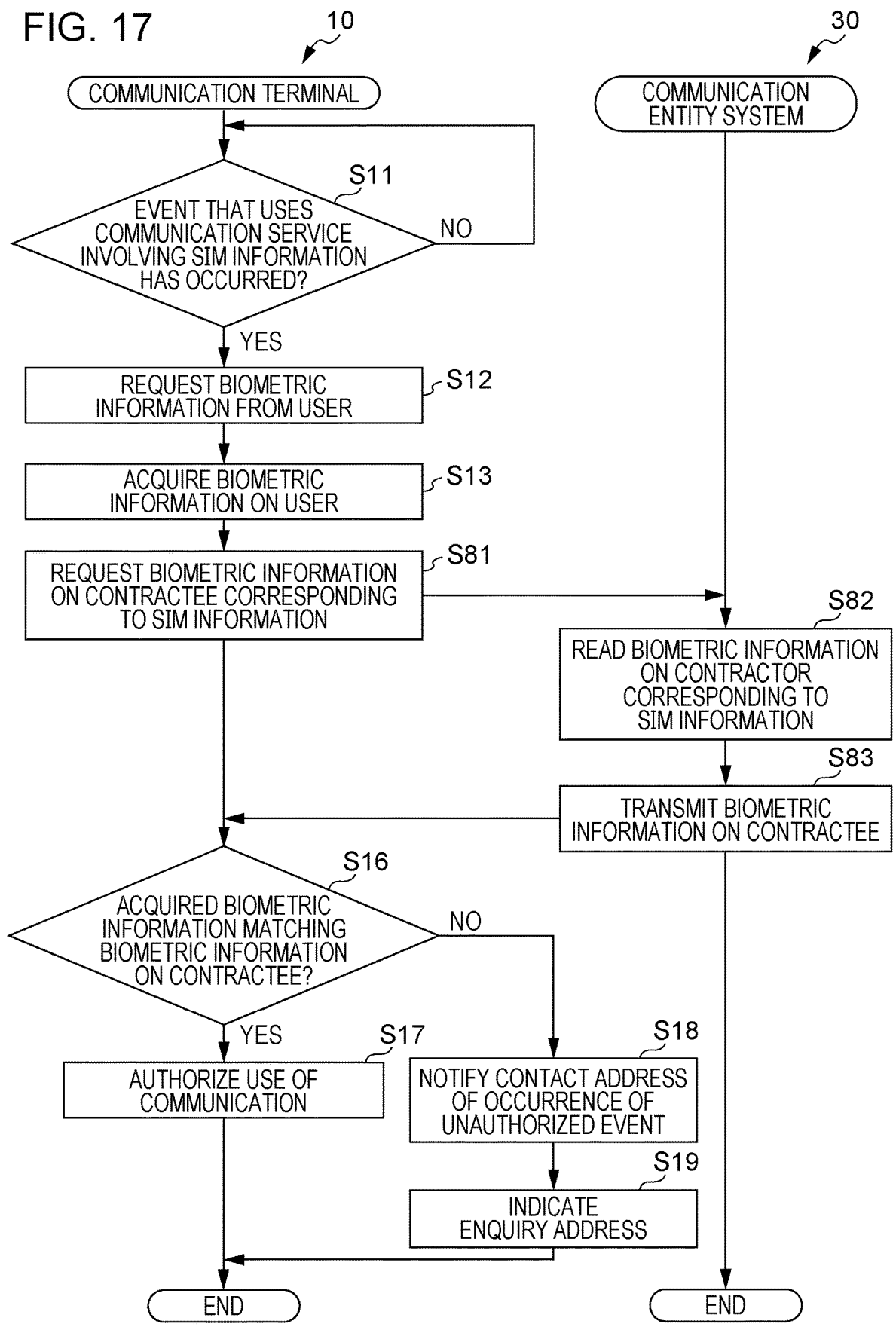
FIG. 17 is a flowchart illustrating another example of the process that is performed to confirm that the user of the communication terminal and the contractee are the same person.

FIG. 17 is a flowchart illustrating a process example 8 that is performed to confirm that the user of the communication terminal 10 and the contractee are the same person. In FIG. 17, steps identical to those in FIG. 7 are designated with the same step numbers.

In the process example 8, the determination as to whether the user is identical to the contractee is performed by the communication terminal 10 and the communication entity system 30 operating in cooperation with each other. In the process example 8, the biometric information on the contractee is stored only on the communication entity system 30.

The process example 6 is started by the communication terminal 10. If the CPU 101 in the communication terminal 10 detects the event to use the communication service involving the SIM information in FIG. 17, the previously described operations in steps S11 through S13 are performed.

Since the biometric information on the contractee is not stored on the communication terminal 10 in the process 8 as previously described, the CPU 101 requests from the communication entity system 30 the biometric information on the contractee corresponding to the SIM information (step S81). The Internet is used to request the biometric information.

The CPU 301 (FIG. 5) in the communication entity system 30 having received the request reads the biometric information on the contractee corresponding to the SIM information (step S82) and transmits the biometric information on the contractee to the communication terminal 10 serving as a requester (step S83). The biometric information on the contractee is transmitted with confidentiality protected to the communication terminal 10.

Upon receiving the biometric information on the contractee from the communication entity system 30, the CPU 101 in the communication terminal 10 performs the operations in steps S16 through S19 in the same way as in the process example 1 (FIG. 7).

In the process example 8, the biometric information on the contractee is not stored on the SIM card 20. Even when the communication terminal 10 is missing and found by someone later, the possibility that an unscrupulous third party illegally obtains the personal information on the contractee may be reduced.

In order to confirm that the user is identical to the contractee, the CPU 101 in the communication terminal 10 uses the biometric information on the contractee from the communication entity system 30. It is thus difficult to spoof the contractee's identity.

In the process example 8, the occurrence of the event to use the biometric information on the contractee may be recognized by the communication entity system 30. The communication entity system 30 may monitor a short message to the communication terminal 10 transmitted from an unscrupulous site.

Second Exemplary Embodiment

In the first exemplary embodiment, the SIM information is stored on the physical recording medium that is removably mounted on the communication terminal 10 (FIG. 1). In other words, the SIM card 20 (FIG. 1) is used.

According to a second exemplary embodiment, the SIM information is written onto the internal memory 102 (FIG. 2) and the internal memory 103 (FIG. 2) that are not removable.

The communication service not using the SIM card 20 according to the second exemplary embodiment is also referred to as an embedded SIM (eSIM) service or a cloud SIM service.

Figure 18:
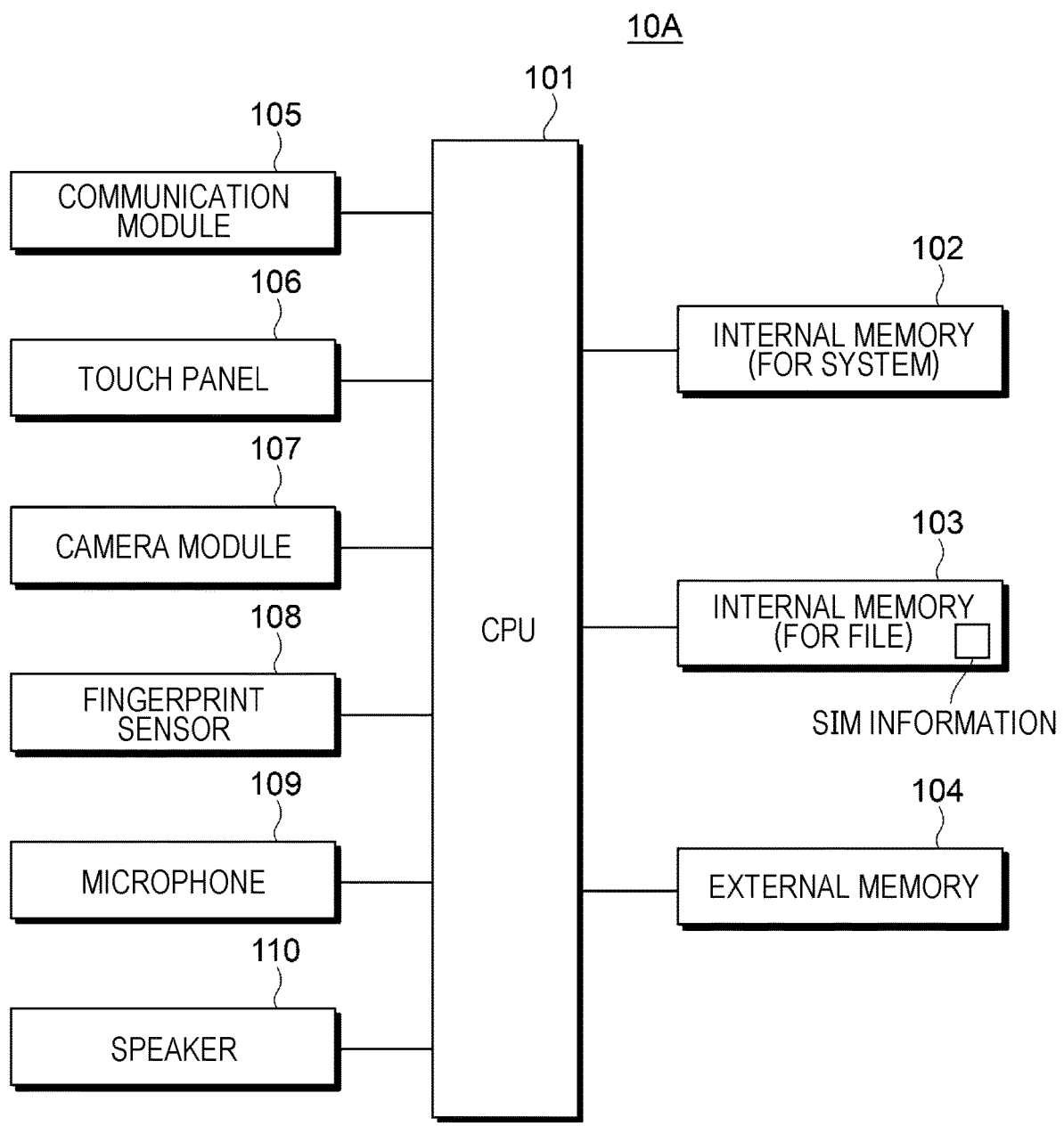
FIG. 18 illustrates an example of a hardware configuration of the communication terminal of a second exemplary embodiment.

FIG. 18 illustrates a hardware configuration of the communication terminal 10A used in the second exemplary embodiment. In FIG. 18, elements identical to those in FIG. 2 are designated with the same reference numerals. The communication terminal 10A of the second exemplary embodiment is an example of the information processing apparatus.

The communication terminal 10A in FIG. 18 is different from the communication terminal 10 (FIG. 2) in that the communication terminal 10A does not use the SIM card 20. Referring to FIG. 18, the SIM information is stored on the internal memory 103. Alternatively, the SIM information may be stored on the internal memory 102.

Figure 19:
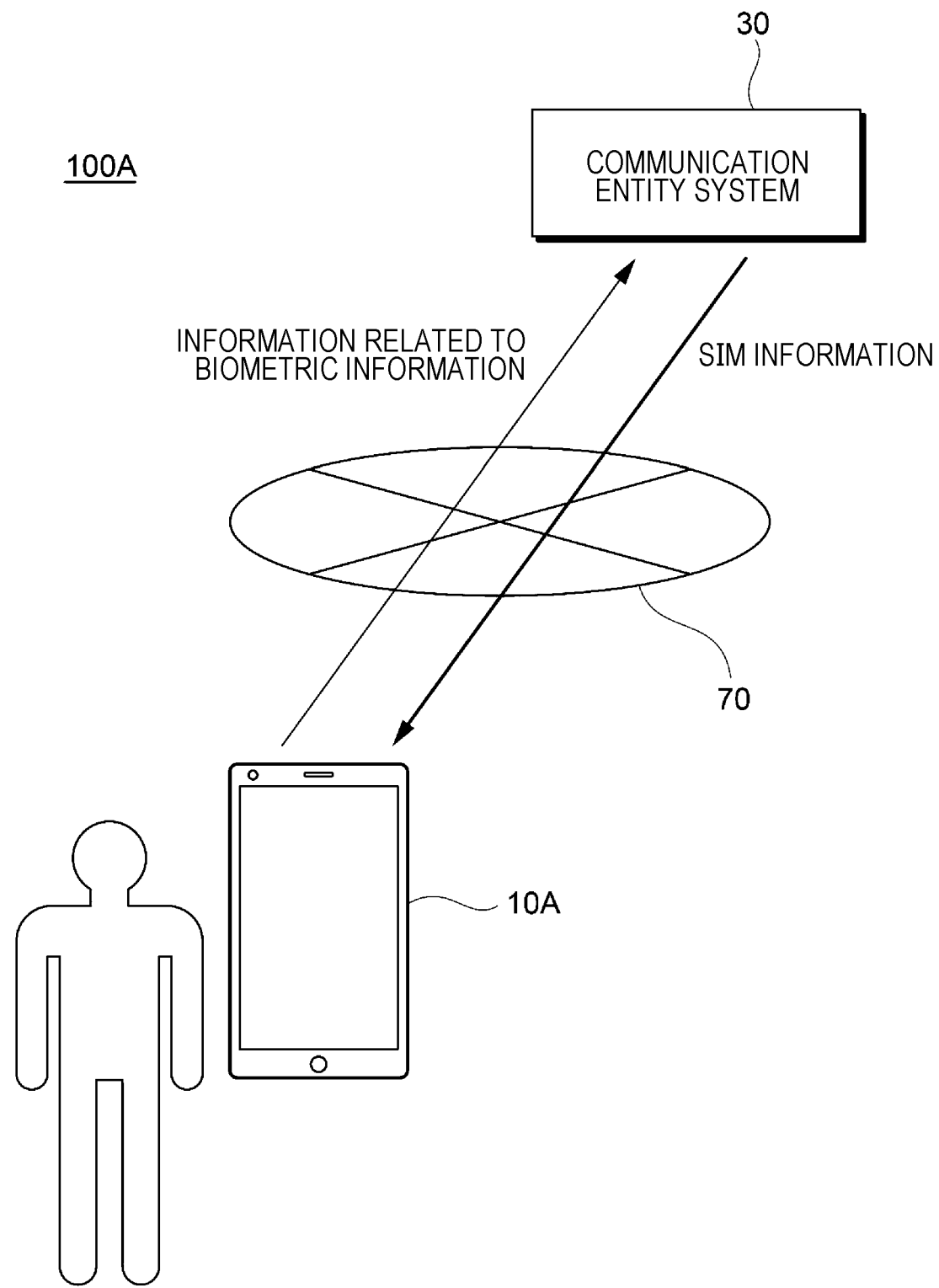
FIG. 19 illustrates an example of a network system that is constructed to control unauthorized use of the communication service.

FIG. 19 illustrates an example of a network system 100A that is constructed to control unauthorized use of the communication service. In FIG. 19, elements identical to those in FIG. 3 are designated with the same reference numerals.

The network system 100A includes a communication entity system 30 and cellular phone network 70. A communication entity uses the communication entity system 30 to manage information on the contractees. The cellular phone network 70 uses the SIM information. The SIM information in a default setting limits a communication destination to the communication entity system 30. For this reason, even before the SIM information is set on the communication terminal 10A, the communication terminal 10A is connectable to the communication entity system 30 via the cellular phone network 70. The communication entity system 30 of the second exemplary embodiment is an example of a server of the communication entity that provides the communication service. The cellular phone network 70 is an example of a communication network that uses the SIM information.

When communication is established with the communication terminal 10A, the communication entity system 30 transmits to the connected communication terminal 10A the SIM information unique to the contractee. The communication terminal 10A stores the received SIM information on the internal memory 102 (FIG. 18) or the internal memory 103 (FIG. 18).

According to the second exemplary embodiment, the communication terminal 10A requests the contractee to register the biometric information in the default setting process thereof. When the biometric information on the contractee is acquired, the communication terminal 10A uploads the information related to the acquired biometric information to the communication entity system 30. In an alternative procedure, the location where the biometric information on the contractee is stored may be limited to the communication terminal 10A.

FIG. 20 illustrates a location where the information related to the biometric information on the contractee is stored.

In a pattern 1, the location where the information related to the biometric information is written may be the internal memory 102 (FIG. 18) or the internal memory 103 (FIG. 18) in the communication terminal 10A.

In a pattern 2, the location where the information related to the biometric information is written is a database (not illustrated) of the communication entity system 30 (FIG. 19).

In a pattern 3, the location where the information related to the biometric information is written is the internal memory 102 or the internal memory 103 in the communication terminal 10A and the database (not illustrated) of the communication entity system 30.

Figure 21:
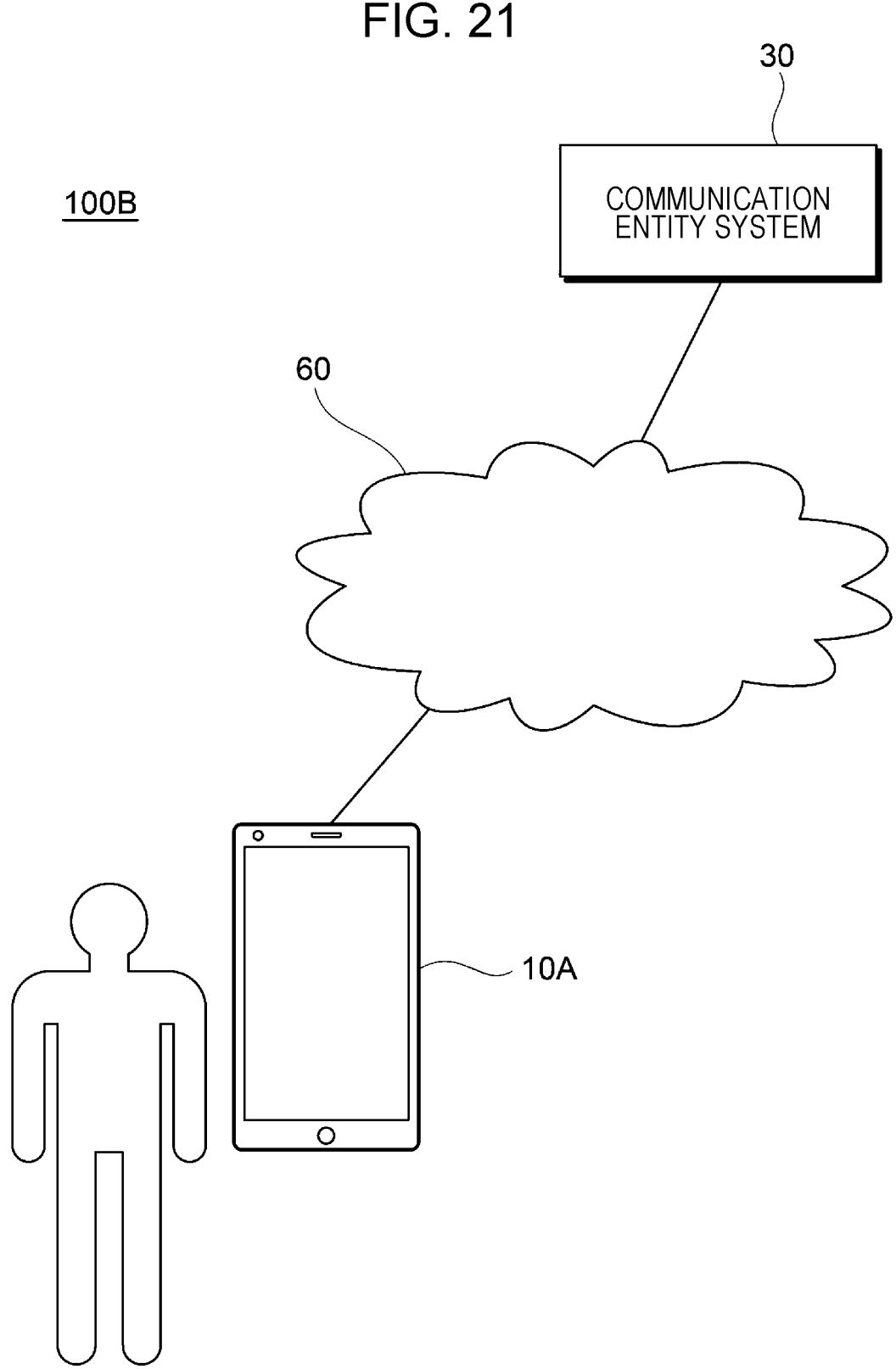
FIG. 21 illustrates an example of a network system that is constructed to control unauthorized use of the communication service.

FIG. 21 illustrates an example of a network system 100B that is constructed to control unauthorized use of the communication service. In FIG. 21, elements identical to those in FIG. 3 are designated with the same reference numerals.

The network system 100B includes the communication entity system 30 and Internet 60. The communication entity uses the communication entity system 30 to control information on the contractee. The Internet 60 is used for communication between the communication terminal 10A and the communication entity system 30.

According to the second exemplary embodiment, the SIM information unique to the contractee is stored on the communication terminal 10A. The user of the communication terminal 10 is not necessarily identical to the contractee. For example, a communication terminal 10A lost and found by someone may be usable in an unauthorized manner.

In the same way as on the communication terminal 10, the communication terminal 10A of the second exemplary embodiment, when using the communication service involving the SIM information, performs again the determination operation to confirm that the user is identical to the contractee.

According to the second exemplary embodiment, the confirmation that the user of the communication terminal 10A is identical to the contractee is established to control the unauthorized use of the communication service in accordance with the process example 1 (FIG. 7), process example 2 (FIG. 10), process example 3 (FIG. 11), process example 6 (FIG. 15), process example 7 (FIG. 16), and/or process example 8 (FIG. 17).

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to:
   determine whether an event that uses a communication service involving subscriber identity module (SIM) information has occurred;
   when it is determined that the event that uses the communication service involving the SIM information has occurred, not authorize use of a communication service when stored first biometric information on a contractee for the communication service fails to match second biometric information acquired from a user who is to use the communication service after signing a contract for the communication service; and
   in a case where a memory storing information used to communicate with a communication network through which the communication service is provided is included in a terminal on which the communication service is available, in response to a request to remove the memory from the terminal, authorize removal of the memory from the terminal on condition that the first biometric information matches the second biometric information acquired from the user.

2. The information processing apparatus according to claim 1, wherein the first biometric information is stored on the memory that stores information used to communicate with a communication network through which the communication service is provided.

3. The information processing apparatus according to claim 2, wherein the processor is configured to, in a case where the information processing apparatus is a terminal on which the communication service is available and the terminal includes the processor and the memory, acquire, from a server of a communication entity providing the communication service, results of checking the first biometric information against the second biometric information.

4. The information processing apparatus according to claim 2, wherein the processor is configured to, in a case where the information processing apparatus is a terminal on which the communication service is available and the terminal includes the processor and the memory, check the first biometric information against the second biometric information and, in response to the first biometric information failing to match the second biometric information, not authorize the use of the communication service.

5. The information processing apparatus according to claim 1, wherein the first biometric information is stored on a memory of a server of a communication entity providing the communication service.

6. The information processing apparatus according to claim 5, wherein the processor is configured to, in a case where the server includes the processor, check the first biometric information against the second biometric information acquired from a terminal on which the communication service is available and notify the terminal of check results.

7. The information processing apparatus according to claim 1, wherein the processor is configured to, in a case where the information processing apparatus is a terminal on which the communication service is available and the terminal includes the processor, authorize the use of the communication service in response to the first biometric information matching the second biometric information acquired to authorize use of the terminal.

8. The information processing apparatus according to claim 1, wherein the processor is configured to, whenever using the communication service is requested, request the second biometric information from the user, and check the first biometric information against the second biometric information.

9. The information processing apparatus according to claim 1, wherein the processor is configured to request the second biometric information from the user at predetermined a time point or at predetermined time intervals, and check the first biometric information against the second biometric information.

10. The information processing apparatus according to claim 1, wherein the processor is configured to, in the case where the memory storing information used to communicate with a communication network through which the communication service is provided is included in a terminal on which the communication service is available, authorize the use of the communication service on the terminal on condition that the first biometric information matches the second biometric information acquired the user.

11. The information processing apparatus according to claim 1, wherein the processor is configured to, even if the first biometric information fails to match the second biometric information, authorize communication with a contact address that receives an enquiry about the communication service.

12. The information processing apparatus according to claim 1, wherein the processor is configured to notify a registered contact address of an occurrence of an unauthorized event when the first biometric information fails to match the second biometric information.

13. The information processing apparatus according to claim 1, wherein the processor is configured to notify the user of a registered enquiry address when the first biometric information fails to match the second biometric information.

14. A non-transitory computer readable medium storing a program causing a computer to execute a process for processing information, the process comprising:
  determining whether an event that uses a communication service involving subscriber identity module (SIM) information has occurred;
  when it is determined that the event that uses the communication service involving the SIM information has occurred, not authorizing use of a communication service in response to stored first biometric information on a contractee for the communication service failing to match second biometric information acquired from a user who is to use the communication service after signing a contract for the communication service; and
  in a case where a memory storing information used to communicate with a communication network through which the communication service is provided is included in a terminal on which the communication service is available, in response to a request to remove the memory from the terminal, authorizing removal of the memory from the terminal on condition that the first biometric information matches the second biometric information acquired from the user.

15. An information processing apparatus comprising:
  means for determining whether an event that uses a communication service involving subscriber identity module (SIM) information has occurred;
  means for, when it is determined that the event that uses the communication service involving the SIM information has occurred, not authorizing use of a communication service in response to stored first biometric information on a contractee for the communication service failing to match second biometric information acquired from a user who is to use the communication service after signing a contract for the communication service; and
  means for, in a case where a memory storing information used to communicate with a communication network through which the communication service is provided is included in a terminal on which the communication service is available, in response to a request to remove the memory from the terminal, authorizing removal of the memory from the terminal on condition that the first biometric information matches the second biometric information acquired from the user.

* * * * *